United States Patent
Shimizu

(10) Patent No.: US 8,062,110 B2
(45) Date of Patent: Nov. 22, 2011

(54) STORAGE MEDIUM STORING GAME PROGRAM AND GAME APPARATUS

(75) Inventor: Kazunobu Shimizu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1148 days.

(21) Appl. No.: 11/478,733

(22) Filed: Jul. 3, 2006

(65) Prior Publication Data

US 2007/0197287 A1 Aug. 23, 2007

(30) Foreign Application Priority Data

Feb. 22, 2006 (JP) .................................. 2006-045177

(51) Int. Cl.
A63F 9/24 (2006.01)

(52) U.S. Cl. ........................................................... 463/2

(58) Field of Classification Search .................. 463/1, 2, 463/9, 32, 33
See application file for complete search history.

(56) References Cited

U.S. PATENT DOCUMENTS

| | | | |
|---|---|---|---|
| 5,863,248 A | 1/1999 | Mine et al. | |
| 6,154,197 A | 11/2000 | Watari et al. | |
| 6,165,073 A | 12/2000 | Miyamoto et al. | |
| 6,196,917 B1 | 3/2001 | Mathias et al. | |
| 6,270,413 B1 | 8/2001 | Aikawa et al. | |
| 6,322,444 B1* | 11/2001 | Matsui et al. ..................... 463/7 |
| 6,371,849 B1 | 4/2002 | Togami | |
| 6,398,641 B1* | 6/2002 | Yamagami et al. ............... 463/9 |
| 6,494,783 B2 | 12/2002 | Namba et al. | |
| 6,524,186 B2 | 2/2003 | Takatsuka et al. | |
| 6,542,155 B1 | 4/2003 | Mifune et al. | |
| 6,762,746 B2 | 7/2004 | Fukuda | |
| 7,371,163 B1 | 5/2008 | Best | |
| 2002/0103031 A1 | 8/2002 | Neveu et al. | |
| 2003/0130020 A1* | 7/2003 | Bates et al. ........................ 463/1 |
| 2003/0162592 A1* | 8/2003 | Takahashi ........................ 463/33 |
| 2004/0143852 A1* | 7/2004 | Meyers ........................ 725/133 |
| 2004/0207602 A1 | 10/2004 | Okamura | |
| 2005/0202869 A1* | 9/2005 | Miyamoto et al. ............... 463/36 |

(Continued)

FOREIGN PATENT DOCUMENTS

JP 10-290886 11/1998
JP 2003-251076 9/2003

OTHER PUBLICATIONS

Bust-A-Move—Game Manual www.replacementdocs.com.*

(Continued)

Primary Examiner — David L Lewis
Assistant Examiner — Eric M Thomas
(74) Attorney, Agent, or Firm — Nixon & Vanderhye P.C.

(57) ABSTRACT

A game apparatus includes a CPU. In the game apparatus, it is determined whether movement state of a player object formed by a plurality of parts has satisfied a predetermined requirement or not. The predetermined requirement is, for example, that a movement speed is equal to or more than a predetermined threshold value, or that an event where a difference in angle between a current movement direction and an immediately preceding movement direction is equal to or more than a predetermined value has been detected a predetermined number of times or more within a given length of time. When the predetermined requirement is satisfied, that is, when there is an input operation to move the player object quickly or when there is an input operation to shake the player object, for instance, the player object is separated into the plurality of parts.

26 Claims, 14 Drawing Sheets

U.S. PATENT DOCUMENTS

2006/0068876 A1* 3/2006 Kane et al. .................. 463/16
2006/0195869 A1* 8/2006 Holm et al. .................. 725/60

OTHER PUBLICATIONS http://www.go2share.net/game/bejeweled/index.htm.* www.ovigaming.com/reviews/item/Snakes.php.*

Pikmin Book, the extra number of Famitsu, Enterbrain, Inc., pp. 36-37, Nov. 2001.

* cited by examiner

MOVE GAME APPARATUS WITH MOUSE CARTRIDGE

PLAYER OBJECT IS MOVED
(= BACKGROUND IS SCROLLED IN OPPOSITE DIRECTION)

CONNECTED ABILITY TABLE

| KIND | NUMBER OF CONSECUTIVE CONNECTIONS (LEVEL) | ABILITY | |
|---|---|---|---|
| | | METHOD OF ATTACK | POWER OF ATTACK |
| INSECT | 1 | SHORT THREAD | LOW |
| | 2 | MEDIUM-LENGTH THREAD | MEDIUM |
| | 3 | LONG THREAD | HIGH |
| | ⋮ | ⋮ | ⋮ |
| FIRE | 1 | SMALL FIRE | LOW |
| | ⋮ | ⋮ | ⋮ |
| WATER | 1 | SMALL BUBBLES | LOW |
| | ⋮ | ⋮ | ⋮ |
| ⋮ | ⋮ | ⋮ | ⋮ |

(A) INSECT (LEVEL 2)

(B) WATER (LEVEL 2)

(C) FIRE (LEVEL 3)

STORAGE MEDIUM STORING GAME PROGRAM AND GAME APPARATUS

CROSS REFERENCE OF RELATED APPLICATION

The disclosure of Japanese Patent Application No. 2006-45177 is incorporated herein by reference.

BACKGROUND OF THE INVENTION

1. Field of the Invention

The present invention relates to a storage medium storing a game program and a game apparatus. More specifically, the present invention relates to a storage medium storing a game program and a game apparatus in which a player object formed by a plurality of parts is separated.

2. Description of the Related Art

One example of game for separating a player object formed by a plurality of parts is disclosed in document 1 (Japanese Patent Laying-open No. 2003-251076). More specifically, a player is required to successfully roll a ball as a player object and collide it with another object so that the collided object is combined with the surface of the ball, whereby the ball grows to an enormous size at an accelerating rate. When coming into collision with the ball, an object smaller than the ball is combined and integrated into the ball. On the contrary, an object larger than the ball acts as an obstacle, and when the obstacle collides with the ball, some of the previously combined objects are disconnected and separated from the ball.

In the above mentioned related art, the separation of an object is expressed such as the collapse of the object caused by a collision with another object. In this game, the player object formed by combining a plurality of parts is merely separated by a collision with another object, and thus a player may not enjoy a feeling of operation or find pleasure in playing the game.

SUMMARY OF THE INVENTION

A novel storage medium storing game program and game apparatus are disclosed herein.

The disclosed storage medium storing game program and a game apparatus allow a player to separate a player object formed by a plurality of parts by an intuitive operation.

The disclosed storage medium storing game program and a game apparatus add interest to operation of a player object formed by a plurality of parts.

A storage medium storing a game program of a first embodiment is a storage medium storing a game program for a game apparatus equipped with an input means for inputting input information in accordance with a player's operation and a display means for displaying a game screen containing a player object formed by a plurality of parts. The game program of the storage medium allows a processor of the game apparatus to serve as a movement control means, a movement state determination means, and a separation means. The movement control means controls the movement of the player object based on the input information from the input means. The movement state determination means determines whether movement state of the player object has satisfied a predetermined requirement or not. The separation means separates the player object into the plurality of parts when the movement state determination means determines that the predetermined requirement has been satisfied.

More specifically, the game program stored in the storage medium performs a game for separating the player object (200: reference numeral corresponding to that in the embodiment. The same applies to the following reference numerals). The game apparatus (10) is provided with the input means (20, 22, 36) and a display means (12, 14). The input means inputs input information according to the player's operation, and the display means displays a game screen containing the player object. The player object is formed by a plurality of parts. In the embodiment described later, for example, the player object is formed by connection with the enemy objects (202). The game program allows the processor (34) of the game apparatus to serve as a movement control means, a movement state determination mean and a separation means. The movement control means (S3, S7) controls the movement of the player object based on the input information. The movement state determination means (S113, S115 to S121) determines whether the movement state of the player object has satisfied a predetermined requirement or not. A predetermined requirement is that the movement speed of the player object is equal to or more than a predetermined threshold value, for example. In addition, a predetermined requirement is that a change in movement direction at a predetermined angle or more has been detected a predetermined number of times within a given length of time. The separation means (S125 to S129) separates the player object into a plurality of parts when it is determined that the movement state has satisfied a predetermined requirement.

As stated above, the player object is separated into a plurality of parts when the movement state of the player object controlled on the basis of the input information has satisfied a predetermined requirement, which allows the player to make the player object come apart by an intuitive operation. Additionally, the separation is achieved according to the movement state, which adds interest to the operation of the player object and thus provides the game with a novel feature of requiring the player to perform a careful operation.

In one embodiment, the movement control means includes a movement speed calculation means for calculating a movement speed of the player object, and the predetermined requirement is that the movement speed calculated by the movement speed calculation means is equal to or more than a predetermined value.

More specifically, the movement speed calculation means (S3) of the movement control means calculates the movement speed of the player object. The movement state determination means (S13) determines whether or not the movement speed of the player object is equal to or more than a predetermined value. Thus, when there is an input operation by which the player object moves rapidly, for example, the player object is separated. In this manner, it is possible to separate the player object into a plurality of parts by an intuitive operation such as moving the player object quickly, which adds interest to the operation of the player object.

In another embodiment, the movement control means includes a movement direction calculation means for calculating a movement direction of the player object, and the predetermined requirement is that an event where a difference of an angle between the movement direction calculated by the movement direction calculation means and an immediately preceding movement direction is equal to or more than a predetermined value has been detected a predetermined number of times or more within a given length of time.

More specifically, the movement direction calculation means (S3) of the movement control means calculates the movement direction of the player object. The movement state determination means (S115 to S121) determines whether or not an event where a change in movement direction from the immediately preceding one forms an angle of a predetermined degree or more has occurred a predetermined number of times or more within a given length of time. Therefore, when there is an input operation by which the player object is shaken, for example, the player object is separated. In this manner, it is possible to separate the player object into a plurality of parts by an intuitive operation such as shaking the player object quickly, which adds interest to the operation of the player object.

In another embodiment, the movement control means controls movement of one of the plurality of parts separated by the separation means, as the player object, based on the input information from the input means, and controls movement of the remaining parts as non-player objects.

More specifically, after the separation, one of the plurality of parts is treated as the player object, and the movement of the player object is controlled on the basis of the input information. Meanwhile, the remaining parts are treated as non-player objects and the movement of the non-player objects is controlled independently of the input information. Thus, even if the player object is separated according to its movement state, the player can control the player object in the same manner as before the separation, without having to perform a complicated operation.

In one aspect, the game program allows the processor to further serve as a display manner change means for changing display manner of one of the plurality of parts separated by the separation means, as the player object.

More specifically, the display manner change means (S129) changes the display manner of one of the separated plurality of parts, as the player object. This makes it easy to identify the player object after the separation.

In another aspect, the game program allows the processor to further serve as an ability change means for changing an ability of the player object separated by the separation means.

More specifically, the ability change means (S125) changes the ability of the separated player object. Thus, the ability of the player object can be changed between before and after the separation, resulting in enhancement of the game's strategic characteristic.

A game apparatus of a second embodiment is a game apparatus equipped with an input means for inputting input information in accordance with a player's operation and a display means for displaying a game screen containing a player object formed by a plurality of parts. The game apparatus comprises a movement control means, a movement state determination means and a separation means. The movement control means controls the movement of the player object based on the input information from the input means. The movement state determination means determines whether movement state of the player object has satisfied a predetermined requirement or not. The separation means separates the player object into the plurality of parts when the movement state determination means determines that the predetermined requirement has been satisfied.

More specifically, the second embodiment is a game apparatus corresponding to the storage medium storing a game program of the first embodiment. As with the above mentioned first embodiment, the second embodiment also makes it possible to separate the player object by an intuitive operation and add interest to the operation of the player object.

In one embodiment, the input means includes a mouse-type input device for detecting movement information of the game apparatus as the input information, and the movement control means controls the movement of the player object based on the movement information detected by the mouse-type input device.

More specifically, the mouse-type input device (36) detects the movement information of the game apparatus as input information. The movement control means controls the movement of the player object based on the movement information of the game apparatus detected by the mouse-type input device. This makes it possible to move the player object according to the movement of the game apparatus itself, which allows the player to control the movement state of the player object by a very intuitive operation. Accordingly, it is possible to separate the player object by an extremely intuitive operation such as moving the game apparatus itself and add interest to the operation of the player object.

The player object is separated into a plurality of parts when the movement state of the player object formed by the plurality of parts has satisfied a predetermined requirement. Thus, it is possible to make the player object come apart by an intuitive operation. In addition, this adds interest to the operation of the player object and thus provides the game with a novel feature of requiring the player to perform a careful operation.

The above described objects and other objects, features, aspects and advantages of the embodiments disclosed herein will become more apparent from the following detailed description of the embodiments when taken in conjunction with the accompanying drawings.

DETAILED DESCRIPTION OF THE PREFERRED EMBODIMENTS

Figure 1:
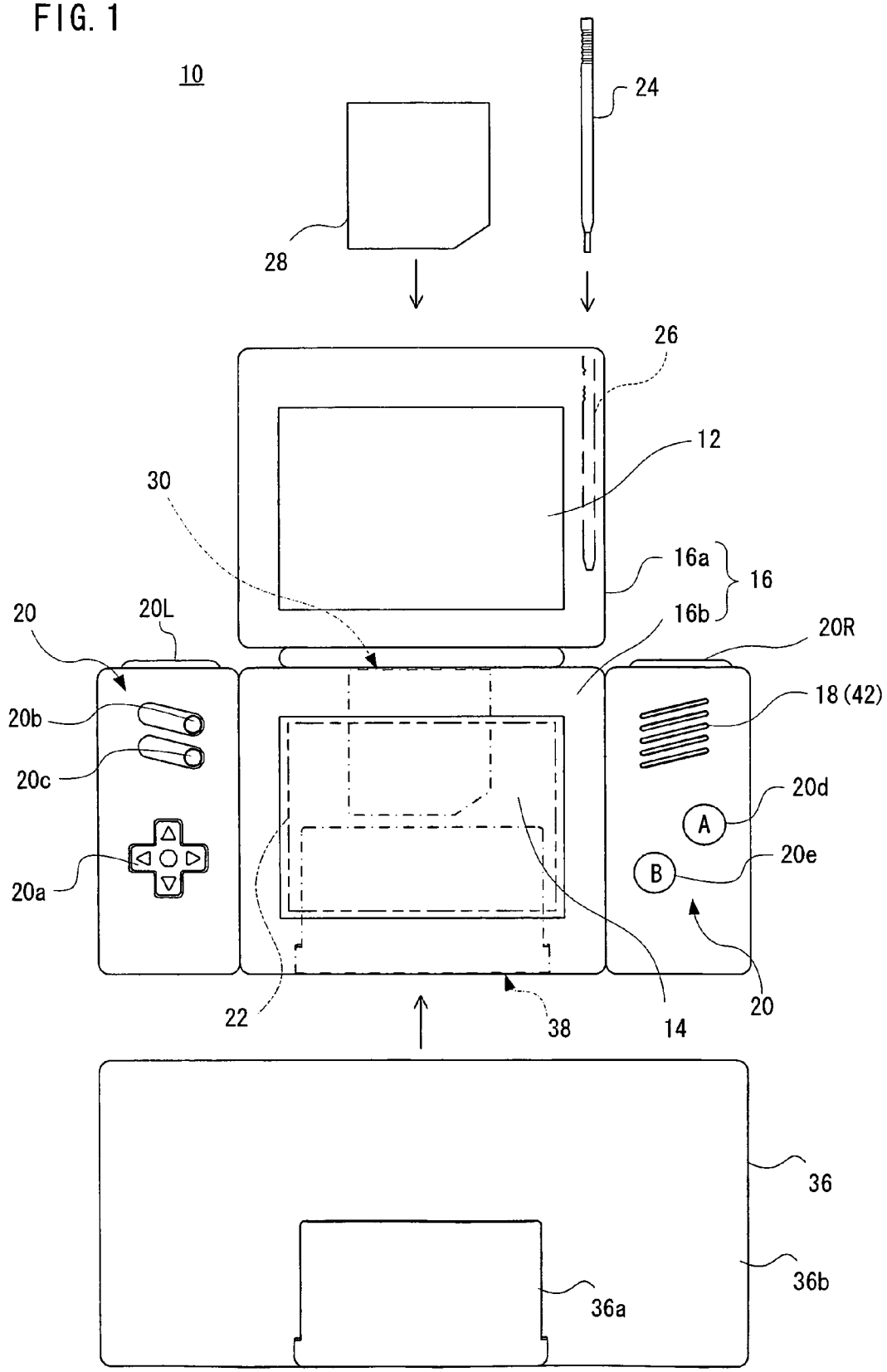
FIG. 1 is an outline view showing one example of game apparatus in one embodiment of the present invention.

Referring to FIG. 1, a game apparatus 10 of one embodiment of the present invention includes a first liquid crystal display (LCD) 12 and a second LCD 14. The LCD 12 and the LCD 14 are stored in a housing 16 so as to be located in predetermined positions. In this embodiment, the housing 16 is formed by an upper housing 16a and a lower housing 16b. The LCD 12 is stored in the upper housing 16a and the LCD 14 is stored in the lower housing 16b. Accordingly, the LCD 12 and the LCD 14 are closely arranged in such a manner to line up vertically (above and below).

Some LCDs are used as displays in the embodiment, and alternatively, EL (Electronic Luminescence) displays and plasma displays may be employed in place of the LCDs.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a plane shape horizontally longer than the upper housing 16a, and has an opening formed so as to expose a display surface of the LCD 14 at an approximately center of the horizontal direction. Furthermore, the lower housing 16b is provided with a sound hole 18 and an operating switch 20 (20a, 20b, 20c, 20d, 20e, 20L and 20R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It is noted that the upper housing 16a and the lower housing 16b are not necessarily rotatably connected with each other, and may alternatively be provided integrally (fixedly) to form the housing 16.

The operating switch or the operating key 20 includes a direction instructing switch (cross switch) 20a, a start switch 20b, a select switch 20c, an action switch (A button) 20d, an action switch (B button) 20e, an action switch (L button) 20L, and an action switch (R button) 20R. The switches 20a, 20b and 20c are placed at the left of the LCD 14 on the one main surface of the lower housing 16b. Also, the switches 20d and 20e are placed at the right of the LCD 14 on the one main surface of the lower housing 16b. Furthermore, the switches 20L and 20R are placed in a part of an upper edge (top surface) of the lower housing 16b at a place except for a connected portion, and lie of each side of the connected portion with the upper housing 16a.

The direction instructing switch (direction key) 20a functions as a digital joystick, and is utilized for instructing a moving direction of an object to be operated. More specifically, by operating one of the four depression portions, a player object (or player character) capable of being operated by a player (user), a cursor, etc. can be moved in a direction corresponding to the operated depression portion.

In this embodiment, described later, the movement of a player object is controlled by movement of the game apparatus 10 itself, not by the direction instructing switch 20a.

The start switch 20b is formed by a push button, and is utilized for starting (restarting), temporarily suspending a game, and so forth. The select switch 20c is formed by the push button, and utilized for a game mode selection, etc.

The action switch (action key) 20d, that is, the A button is formed by the push button, and allows the player character to perform an action except for instructing the direction. In this embodiment, operating the A button 20d allows the player object to make an attack on its enemy.

In general, the A button 20d enables the player object to make an arbitrary action such as hitting (punching), throwing, holding (obtaining), riding, jumping, cutting, etc. In an action game, for example, this button can be used to instruct the player object to perform such actions as jumping, punching, moving a weapon, etc. In a role-playing game (RPG) and a simulation RPG, this button makes it possible to instruct the player object to obtain an item, select and confirm a weapon or a command, etc. Additionally, in menu selection, the player can use this button to confirm a menu item at which the cursor is placed, that is, a selected menu item and execute an action or process corresponding to the item.

The action switch 20e, that is, the B button is formed by the push button, and is utilized for changing a game mode selected by the select switch 20c, canceling an action determined by the A button 20d, and so forth, for example. The B button can also be used as an action key for instructing a player character to make an action, as with the A button 20d.

The action switch 20L (L button) and the action switch 20R (R button) are formed by the push button. The L button 20L and the R button 20R can perform the same operations as the action switches 20d, 20e or perform different operations. These buttons can also be used to perform auxiliary operations for the action switches 20d, 20e. Each of the above mentioned push buttons may be configured as a switch that is activated by depressing its key top. This allows the player to specify an action through an easy operation of depressing any of the switches.

Also, a touch panel 22 is provided on a top surface of the LCD 14. For the touch panel 22, any one of a resistance film system, an optical system (infrared rays system) and an electrostatic capacitive coupling system, for example, can be employed. When the player depresses, strokes, touches or hits a top surface of the touch panel 22 with a stick 24, a pen (stylus pen) or a finger (hereinafter, referred to as "stick 24, etc."), the touch panel 22 detects coordinates of position of a portion specified (touched) by the player with the stick 24, etc., and outputs coordinate data indicative of the detected coordinates. Thus, the player can input the coordinates corresponding to the touch position by operating the touch panel 22 with the stick 24, etc.

In this embodiment, a resolution of the display surface of the LCD 14 is 256 dots×192 dots, and a detection accuracy of (operating surface) of the touch panel 22 is also set to 256 dots×192 dots in correspondence to the resolution of the display surface (the same or almost same thing applies to the LCD 12). Although FIG. 1 shows the touch panel 22 in a different size from the LCD 14 for the sake of clarity, the display screen of the LCD 14 and the operating surface of the touch panel 22 are the same in size. The detection accuracy of the touch panel 22 may be lower or higher than the resolution of the display surface. Further, the touch panel 22 may be provided on the upper surface of the LCD 12 or provided on both the LCD 12 and the LCD 14.

In this embodiment, the stick 24 can be stored in a housing portion (slot or concave portion) 26 provided in proximity to a side surface (right side surface) of the upper housing 16a, for example, and taken out therefrom as necessary. However, if the stick 24 will not be prepared, it is not necessary to provide the housing portion 26.

The game apparatus 10 includes a memory card (or game cartridge) 28 in which a game program and data are stored in advance. The memory card 28 is detachable, and inserted into a loading slot 30 provided on a rear side or top side (upper end) of the lower housing 16b. Although not shown in FIG. 1, a first connector 32 (see FIG. 2) is provided behind the loading slot 30 for joining with a connector (not shown) provided at a front edge of the memory card 28 in the insertion direction. Accordingly, when the memory card 28 is inserted into the loading slot 30, the connectors join with each other and thus a CPU core 34 (see FIG. 2) of the game apparatus 10 can access the memory card 28.

Further, in this embodiment, the game apparatus 10 includes a mouse cartridge 36 as one input means. A housing of the mouse cartridge 36 is formed with a portion 36a to be inserted into a loading slot 38 provided on a rear side or lower end of the lower housing 16b of the game apparatus 10 and a portion 36b covering the rear side of the lower housing 16b. The mouse cartridge 36 is attachable to and detachable from the game apparatus 10. Although not shown in FIG. 1, a second connector 40 (see FIG. 2) is provided behind the insertion slot 38 for joining with a connector (not shown) provided at the front edge of the housing 36a in the insertion direction. Accordingly, when the mouse cartridge 36 is loaded into the lower housing 16b by inserting the insertion portion 36a of the mouse cartridge 36 into the loading slot 38, the connectors join with each other and thus the CPU core 34 of the game apparatus 10 can access the mouse cartridge 36. Provided on the rear side of the mouse cartridge 36 is a position sensor for use in an optical mouse (or a mechanical mouse). When the mouse cartridge 36 is attached to the game apparatus 10, the position sensor of the mouse cartridge 36 is located on the rear side of the game apparatus 10 (basically, the bottom side when in use). Thus, when the game apparatus 10 is used on the surface of a desk or wall, for example, the mouse cartridge 36 serves as a mouse-type input device of the game apparatus 10, and detects the movement information of the game apparatus 10 on the surface, such as movement direction, movement amount and movement speed.

Although not illustrated in FIG. 1, a speaker 42 (see FIG. 2) is provided in a position corresponding to the sound hole 18 inside the lower housing 16b. Further, although not shown in FIG. 1, a battery accommodating box is provided on the rear side of the lower housing 16b, and a power switch, a volume switch, an external expansion connector, and an earphone jack, etc. may be provided on the lower side of the lower housing 16b, for example.

Figure 2:
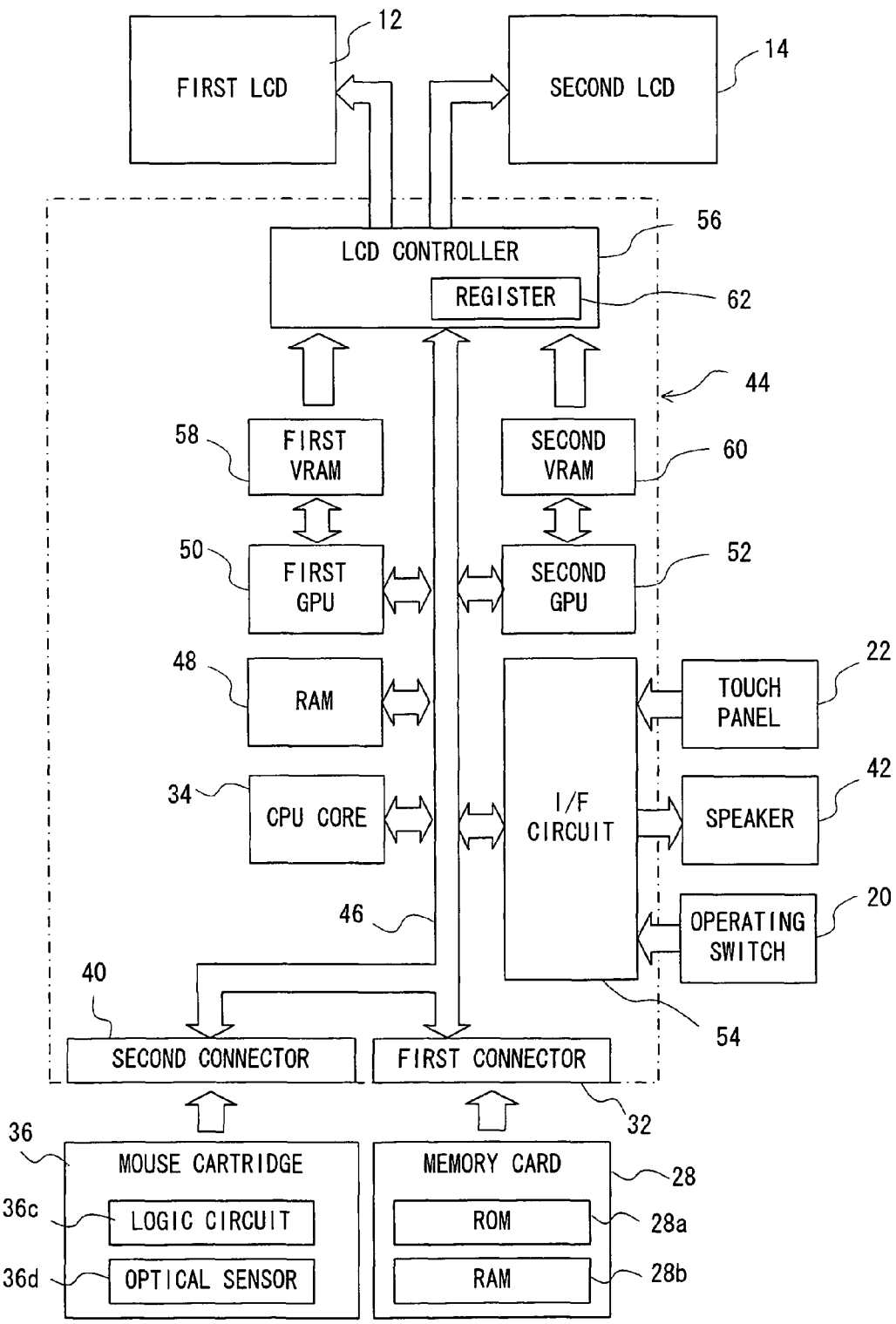
FIG. 2 is a block diagram showing one example of electrical configuration of FIG. 1 embodiment.

FIG. 2 is a block diagram showing an electric configuration of the game apparatus 10. Referring to FIG. 2, the game apparatus 10 includes an electronic circuit board 44 on which circuit components such as a CPU core 34 are mounted. The CPU core 34 is connected with the above mentioned first connector 32 and second connector 40 via a bus 46, and is also connected with a RAM 48, a first graphics processing unit (GPU) 50, a second GPU 52, an input-output interface circuit (hereinafter, referred to as "I/F circuit") 54, and an LCD controller 56.

The memory card 28 is detachably connected to first connector 32. The memory card 28 includes a ROM 28a and a RAM 28b. Although illustration is omitted, the ROM 28a and the RAM 28b are connected with each other via a bus, and they are also connected with the connector (not shown) to be joined with the first connector 32. Accordingly, the CPU core 34 can access the ROM 28a and the RAM 28b as described above.

The ROM 28a stores a game program for a virtual game to be executed by the game apparatus 10, image data (character images, object images, background images, item images, icon (button) images, message images, cursor images etc.), sound data for reproduction or output of sounds (music) required for the game, and so forth. The RAM (backup RAM) 28b is provided to store (save) in-progress data and result data of the game. A nonvolatile memory such as a flash memory can be employed for the RAM 28b.

In executing an application other than a game program, the ROM 28a of the memory card 28 stores a program for the application and data required for execution of the application (image data, sound data, etc.).

The mouse cartridge 36 is detachably connected to the second connector 40. The mouse cartridge 36 includes a logic circuit 36c and an optical sensor 36d. Although not illustrated, the logic circuit 36c and the optical sensor 36d are connected with each other via a bus, and they are also connected with the connector not shown that is joined with the second connector 40. The logic circuit 36c acquires sensor information from the optical sensor 36d at regular time intervals, for example. The optical sensor 36d includes a infrared light-emitting element and an image sensor, for instance. The logic circuit 36c detects movement information of the game apparatus 10 such as movement direction and movement amount by subjecting an infrared image detected by the optical sensor 36d to image processing, and provide the movement information (input information) to the CPU core 34. Instead of an optical mouse, a mechanical mouse for detecting a ball's rotation in an X direction and a Y direction may be employed.

The RAM 48 is utilized as a buffer memory or a working memory. That is, the CPU core 34 loads the program, the image data, the sound data, etc. stored in the ROM 28a of the memory card 28 into the RAM 48, and executes a process according to the loaded program. The CPU core 34 executes a game process while storing in the RAM 48 data (game data, flag data, etc.) generated or obtained in correspondence with the progress of the game, etc.

Such a program, image data, sound data, etc. are loaded from the ROM 28a entirely at a time, or partially and sequentially, and stored (loaded) into the RAM 48. However, for the game apparatus 10 in which a storage medium storing fixedly a program and data can be connected directly to the CPU core 34, as in the case with this embodiment, it is not necessary to transfer and store the program and data in the RAM 48 because the CPU core 34 can access directly the storage medium. In addition, the data stored in the RAM 28b would be read into the RAM 48 as required.

Each of the GPU 50 and the GPU 52 forms a part of a rendering means, is constructed by, for example, a single chip ASIC, and receives a graphics command (graphics command) from the CPU core 42 to generate game image data according to the graphics command. However, the CPU core 42 provides each of the GPU 50 and the GPU 52 with an image generating program (included in the game program) required for generation of the game image data in addition to the graphics command.

Furthermore, the GPU 50 is connected with a first video RAM (hereinafter, referred to as "VRAM") 56, and the GPU 52 is connected with a second VRAM 58. The GPU 50 and the GPU 52 obtain data required for the GPU 50 and the GPU 52 to execute the graphics command (image data: character data, texture data, etc.) by access to a first VRAM 56 and a second VRAM 58, respectively. Also, the CPU core 42 writes the image data required for graphics drawing into the first VRAM 56 and the second VRAM 58 via the GPU 50 and the GPU 52. The GPU 50 accesses the VRAM 56 to generate the game image data for graphics drawing, and the GPU 52 accesses the VRAM 58 to generate the game image data for graphics drawing.

The VRAM 56 and the VRAM 58 are connected to the LCD controller 60. The LCD controller 60 includes a register 62, and the register 62 consists of, for example, one bit, and stores a value of "0" or "1" (data value) according to an instruction of the CPU core 42. In a case that the data value of the register 62 is "0", the LCD controller 60 outputs the game image data generated by the GPU 50 to the LCD 12, and outputs the game image data generated by the GPU 52 to the LCD 14. Furthermore, in a case that the data value of the register 62 is "1", the LCD controller 60 outputs the game image data generated by the GPU 50 to the LCD 14, and outputs the game image data generated by the GPU 52 to the LCD 12.

Besides, the LCD controller 60 reads out game image data directly from the VRAM 56 and the VRAM 58, and reads out game image data from the VRAM 56 and the VRAM 58 via the GPU 50 and the GPU 52.

The I/F circuit 54 is connected with the operating switch 20, the touch panel 22, the speaker 32. Here, the operating switch 20 is the above-described switches 20a, 20b, 20c, 20d, 20e, 20L and 20R, and in response to an operation of the operating switch 20, a corresponding operation signal is input to the CPU core 42 via the I/F circuit 54. Furthermore, the coordinate position data from the touch panel 22 is input to the CPU core 42 via the I/F circuit 54. In addition, the CPU core 42 reads the sound data necessary for the game such as game music (BGM), sound effects and voices (onomatopoeic sounds) of game characters (game objects), etc. from the RAM 48, and outputs it from the speaker 32 via the I/F circuit 54.

The second connector 40 is connected detachably with the mouse cartridge 36. The mouse cartridge 36 includes a logic circuit 36c and an optical sensor 36d. Although not illustrated, the logic circuit 36c and the optical sensor 36d are connected with each other via a bus, and also they are connected to the connector not shown which is jointed to the second connector 40.

Figure 3:
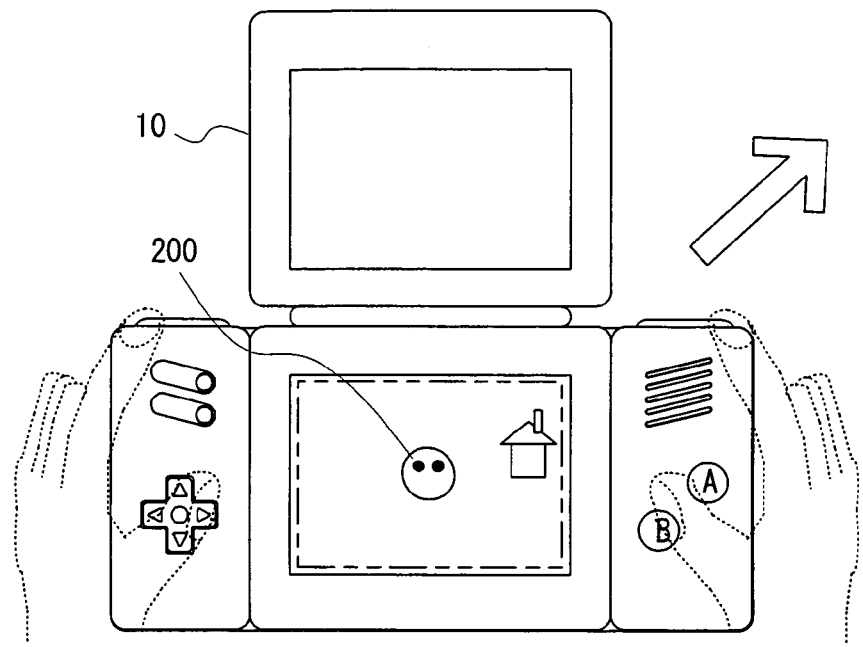
FIG. 3 is an illustrative view showing a general description of movement of a player object in accordance with the movement of a game apparatus in FIG. 1 embodiment.
Figure 3:
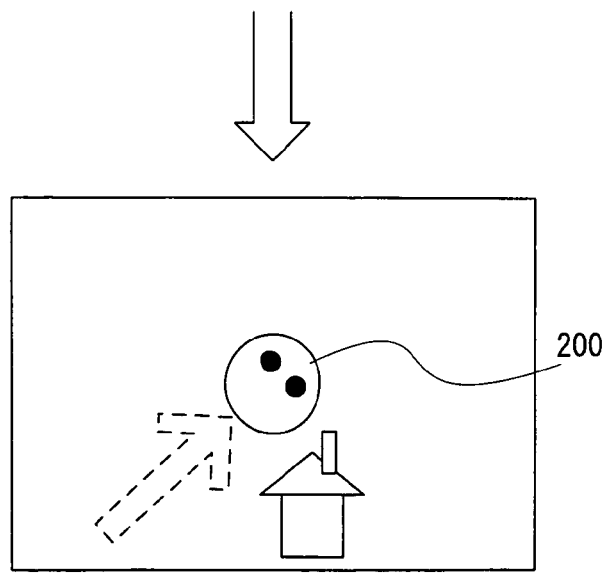

Since the game apparatus 10 of this embodiment is provided with the mouse cartridge 36 as described above, the player can perform an operation on or an input to the game screen by moving the game apparatus 10 itself on the surface of a desk or wall, for example. Such an input operation produces variations in the game screen such as moving an object in a virtual game space and moving a cursor on the screen, for instance. More specifically, according to this embodiment, by moving the game apparatus 10 on the surface of a desk, etc. as shown in FIG. 3, it is possible to move a player object 200 in a game space by a distance corresponding to the amount of movement of the game apparatus 10 or at a speed corresponding to the speed of movement of the game apparatus 10 in a direction corresponding to the direction of movement of the game apparatus 10. In FIG. 3, moreover, the display position of the player object 200 is fixed at the center of the screen, and thus the background is scrolled in the direction opposite to the movement of the game apparatus 10. The player object 200 may be displayed on the upper screen (LCD 12), instead of the lower screen (LCD 14).

Figure 4:
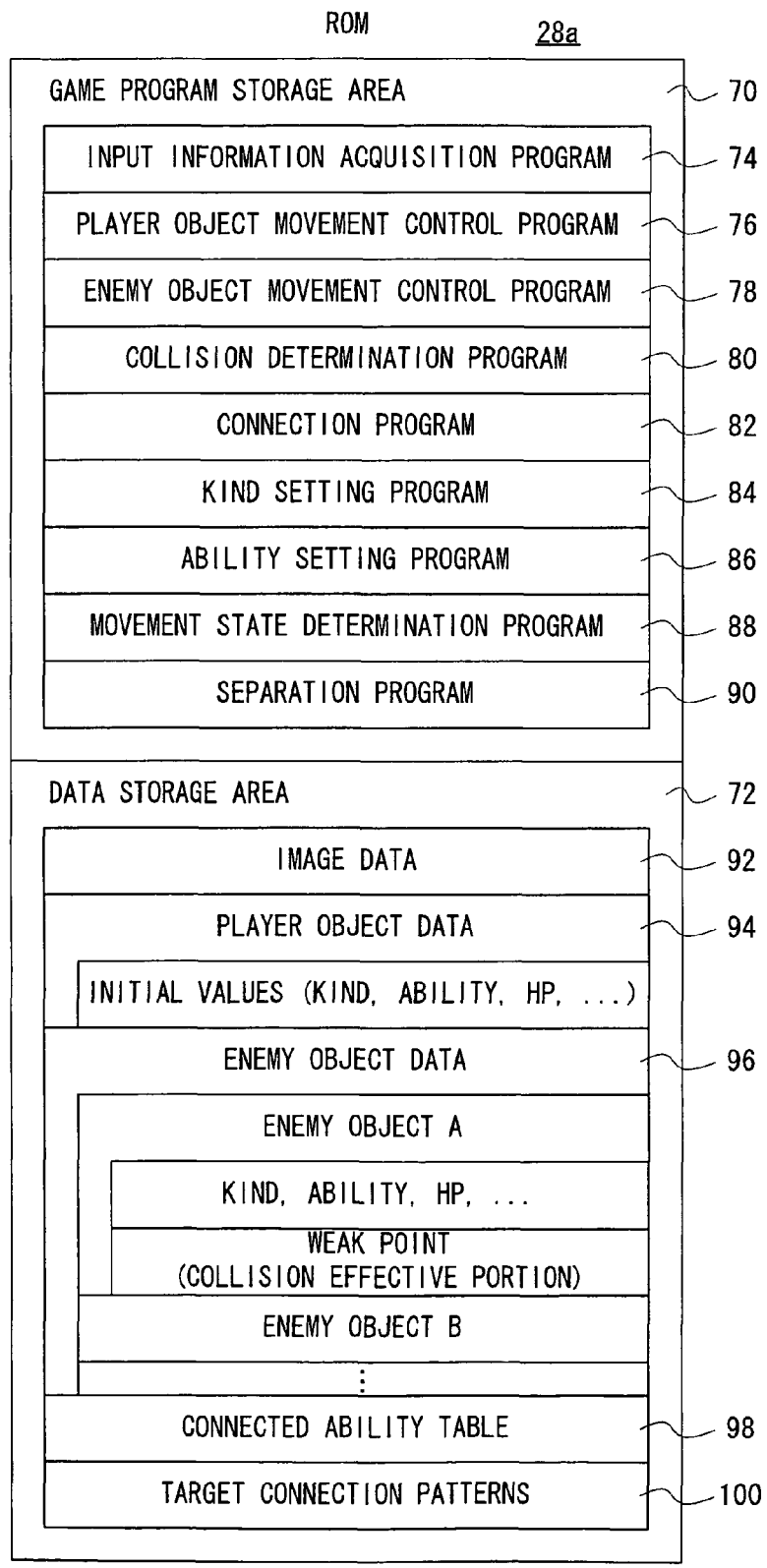
FIG. 4 is an illustrative view showing one example of memory map of a ROM in a memory card in FIG. 1 embodiment.
Figures 5, 6:
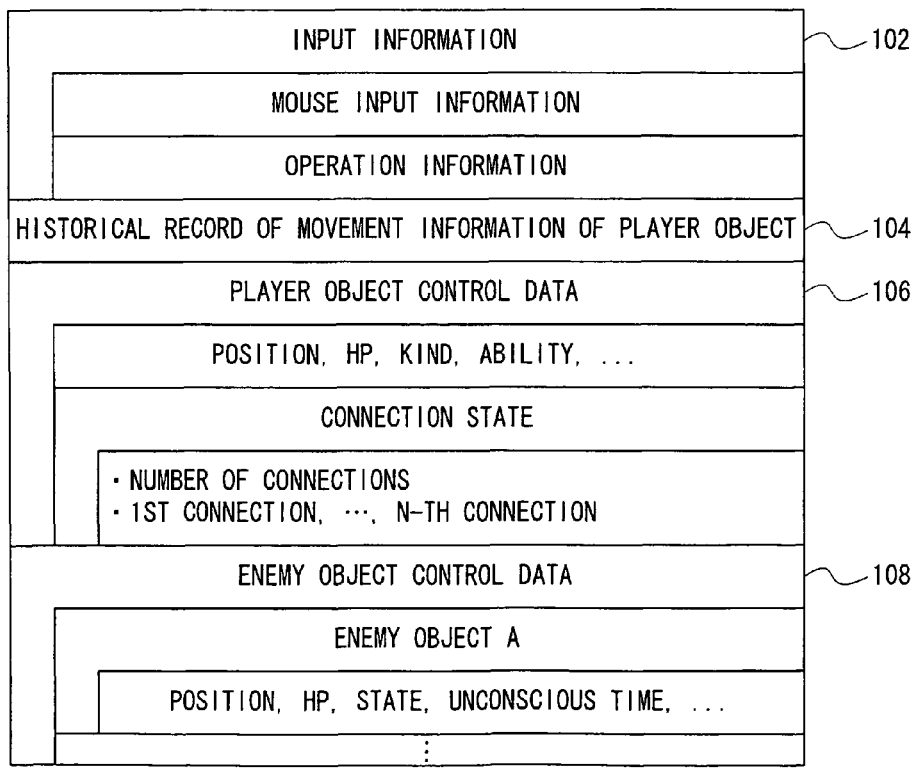
FIG. 5 is an illustrative view showing one example of connected ability table.
FIG. 6 is an illustrative view showing one example of memory map of a RAM in the game apparatus in FIG. 1 embodiment.

FIG. 4 to FIG. 6 show examples of memory maps. Firstly, FIG. 4 presents a memory map of the ROM 28a in the memory card 28. The ROM 28a contains a game program storage area 70 and a data storage area 72. FIG. 4 shows a part of the memory map, and both the game program storage area 70 and the data storage area 72 also store in advance other necessary programs and data in addition to those described in the drawings.

A storage area 74 of the game program storage area 70 stores an input information acquisition program. By this program, input information is acquired from the operating switch 20, the touch panel 22 and the mouse cartridge 36 at intervals of regular time (one frame etc.), for instance.

A storage area 76 stores a player object movement control program. By this program, control is exercised on the movement of the player object in the virtual game world. In this embodiment, the movement of the player object 200 is controlled on the basis of the input information from the mouse cartridge 36 as stated above. More specifically, parameters of movement of the player object 200 such as movement direction, movement distance and movement speed are calculated based on the movement information (movement direction, amount, speed, etc.) of the game apparatus 10 acquired from the mouse cartridge 36, and the new position (coordinates) and direction, etc. of the player object 200 are determined by calculation on the basis of the movement parameters.

A storage area 78 stores an enemy object movement control program. By this program, the movement of a non-player object such as an enemy object 202 (see FIG. 7) is controlled. The non-player object refers to an object not operated by the player. In this embodiment, as described later, the enemy object is treated as a part of the player object 200 when it is connected to the player object 200.

A storage area 80 stores a collision determination program. By this program, a determination is made about a collision between the player object 200 and the enemy object 202. If it has a weak point, the enemy object 202 is provided with a collision effective portion indicative of its weak point. In this case, the determination is made whether or not the player object 200 has collided with the collision effective portion.

A storage area 82 stores a connection program. By this program, when the player object 200 collides with the enemy object 202, the enemy object 202 is connected to the player object 200. In this embodiment, since the movement of the player object 200 is controlled on the basis of the input information from the mouse cartridge 36, the player object 200 is moved in accordance with the movement of the game apparatus 10 itself and is connected with the enemy object 202 with which it has collided. This achieves a highly entertaining game that enables a player to connect the enemy object 202 to the player object 200 by such an extremely intuitive operation.

When the player object 200 comes into collision with the enemy object 202, the two may be unrequirementally connected with each other. Alternatively, one or more requirements may be set for connecting the enemy object 202 to the player object 200. In this embodiment, one requirement for the connection is that the enemy object 202 is in a predetermined state (e.g. unconscious state) when it is collided. In this manner, since the requirement for the connection is the enemy object 202 being in the predetermined state, it is possible to raise the degree of difficulty in connecting the enemy object 202, thereby increasing the game's strategic characteristics.

Figure 7:
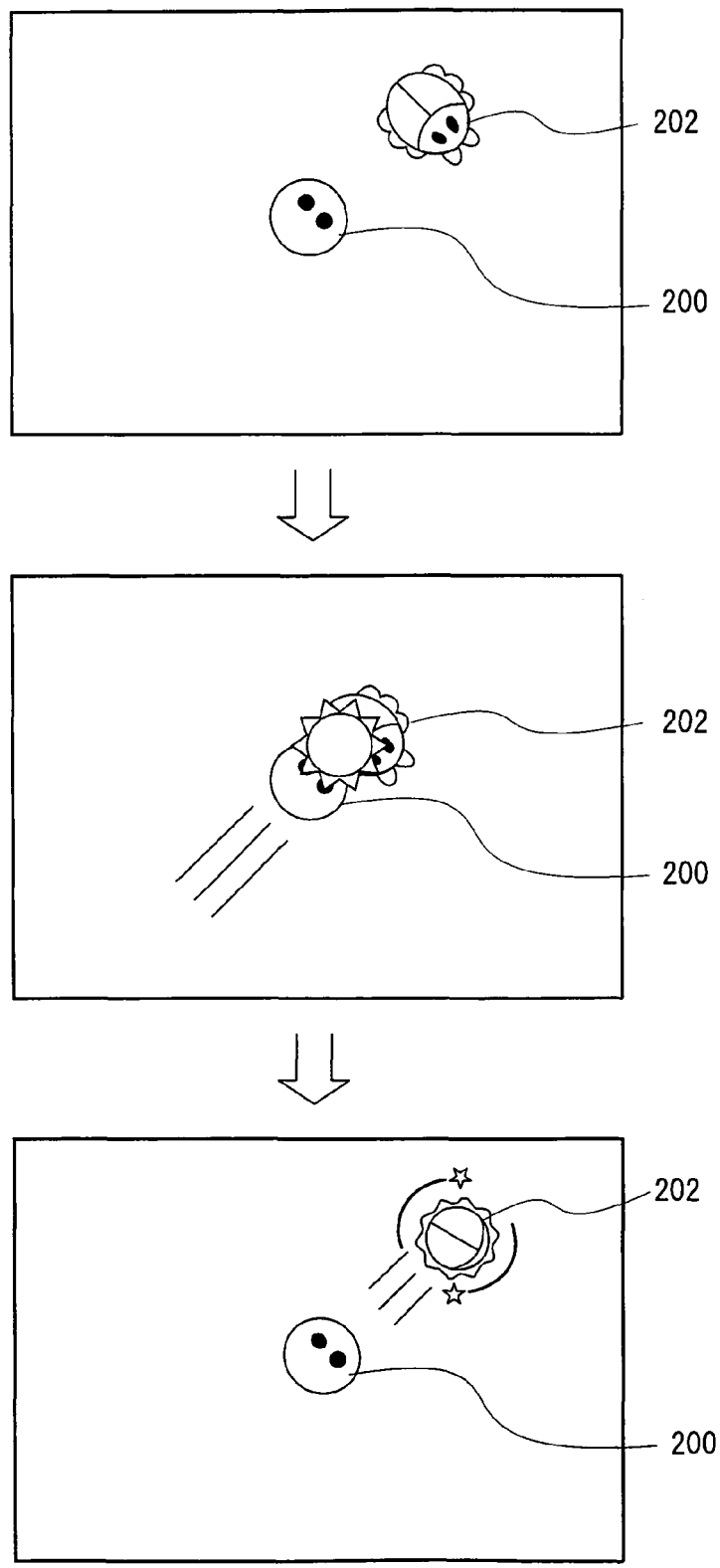
FIG. 7 is an illustrative view showing a scene in which a non-player object is being turned into an unconscious state.

Further, a requirement can be set for turning the enemy object 202 into the above mentioned unconscious state. In this embodiment, the requirement for unconsciousness is that the movement speed of the player object 200 (movement amount per unit of time) is equal to or more a predetermined threshold value (e.g. five dots/frame) when it comes into collision with the enemy object 202. Thus, when there exists the enemy object 202 as a target at the upper right of the player object 200 as shown in FIG. 7, for example, the player makes the player object 200 collide with the enemy object 202 by moving the game apparatus 10 in the upward and rightward direction to obtain a movement speed being equal to or more than the threshold value. Accordingly, the enemy object 202 is flicked by the collision and turned into the unconscious state for a given length of time. As above, it is possible to raise the degree of difficulty in turning the enemy object 202 into a predetermined state with a further enhancement in the game's strategic characteristics.

The state of the enemy object 202 may be changed at intervals of regular time or at random, for example, that is, regardless of the player's operation.

Also, if the enemy object 202 has a weak point, the requirements for unconsciousness or the requirements for connection may include a collision of the weak point (the collision effective portion). The degree of difficulty in turning the enemy object 202 into a predetermined state or the degree of difficulty in connecting the enemy object 202 can be also raised by setting such a weak point, whereby the game's strategic characteristics are further enhanced.

Moreover, by setting compatibility between the kind of the player object 200 and the kinds of the enemy objects 202, the unconsciousness requirements or the connecting requirements may include high compatibility. In this case, the ROM 28a stores in advance compatibility data indicating compatibility among the kinds of the objects. For instance, if the compatibility data is stored indicating that an object of fire and an object of water are highly compatible and that an object of fire and an object of insect or an object of fire and an object of no kind are incompatible, the player object 200 must be of water in order to turn the enemy object 202 of fire into the unconscious state.

Figure 8:
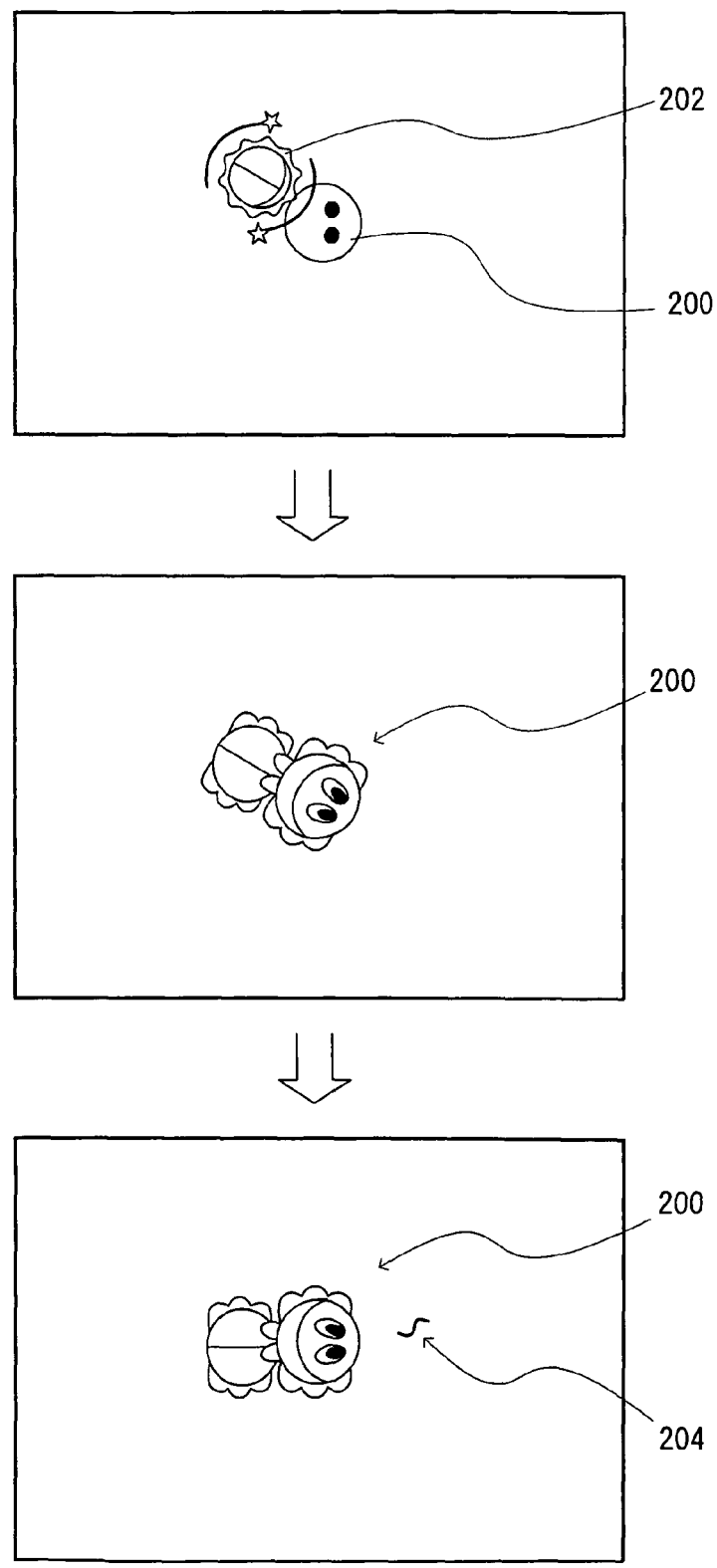
FIG. 8 is an illustrative view showing a scene in which a non-player object is connected to a player object.

When the player object 200 collides with the enemy object 202 in the predetermined state, the connection requirement is satisfied and the enemy object 202 is connected to the player object 200 as shown in FIG. 8. After that, the entire object containing the connected enemy object 202 is treated as player object 200. In this embodiment, the initial player object 200 constitutes the head of the connected player object 200, and the initial enemy object 202 becomes a part (connected body) of the connected player object 200. Afterward, whenever the player object 200 collides with another enemy object 202 and it is determined that the connection requirement has been satisfied, the enemy objects 202 are sequentially connected as new connected bodies. In this manner, after the connection, the player object 200 is formed by the initial player object 200 and one or more enemy objects 202, that is, a plurality of parts.

Returning to FIG. 4, a storage area 84 stores a kind setting program. By this program, the kind of the player object 200 is set. In this embodiment, the player object 200 initially does not belong to any kind, and is set to be of the same kind as the enemy object 202 with which it is firstly connected. Therefore, the player object 200 can be changed into the player objects 200 of any of various kinds according to the kind of the firstly connected enemy object 202, making it possible to increase the game's amusing characteristics. In the examples shown in FIG. 7 and FIG. 8, the kind of the enemy object 202 is insect and thus the kind of the connected player object 200 is changed into insect as well, and the player object 200 is displayed as an image of an insect as shown in the middle part of FIG. 8.

A storage area 86 stores an ability setting program. By this program, the ability of the player object 200 is set. The ability given to the player object 200 varies depending on the kind of the connected enemy objects 202. In this embodiment, the ability of the player object 200 initially has no characteristics, and is then changed in correspondence with the kind of the enemy object 202 by the connection to the enemy object 202. More specifically, the ability refers to the method of attack, the power of attack and the like. In the example of FIG. 8, since the kind of the player object 200 is turned into insect, the player object 200 is given the ability corresponding to insect. The insect's method of attack is discharge of a thread and the insect's initial power of attack is at a low level. Consequently, the player object 200 discharges a thread 204 in a forward direction according to the player's attack operation (e.g. the operation of the A button 20d) as illustrated in the lower part of FIG. 8. When the thread 204 hits the enemy object 202, the enemy object 202 suffers low-level damage.

As stated above, the player object is given the ability according to the kind of the connected enemy object 202, which enhances the game's strategic characteristics and increases its interest. In addition, the degree of difficulty in playing the game subsequently is changed according to the ability given to the player object 200, which makes the game richer in variation.

Figure 9:
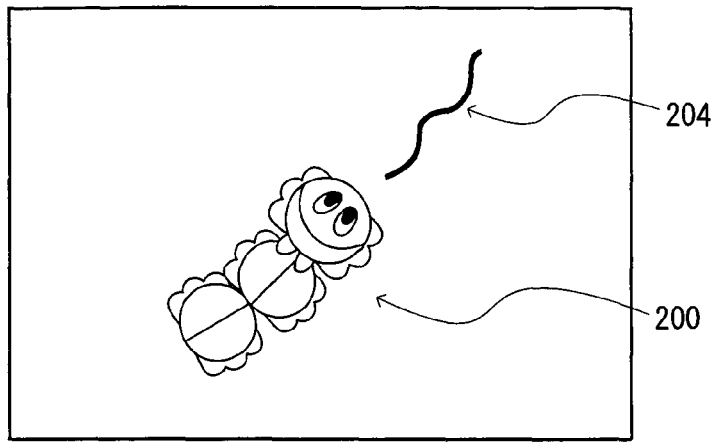
FIG. 9 is an illustrative view showing one example of player object given different abilities in accordance with the kinds of connected non-player objects.
Figure 9:
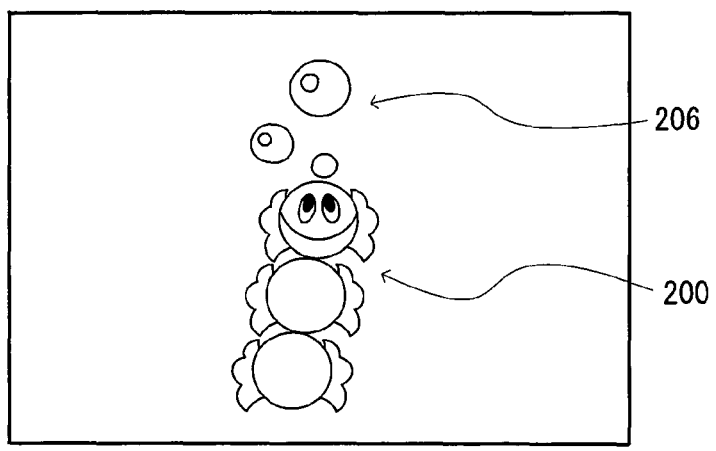
Figure 9:
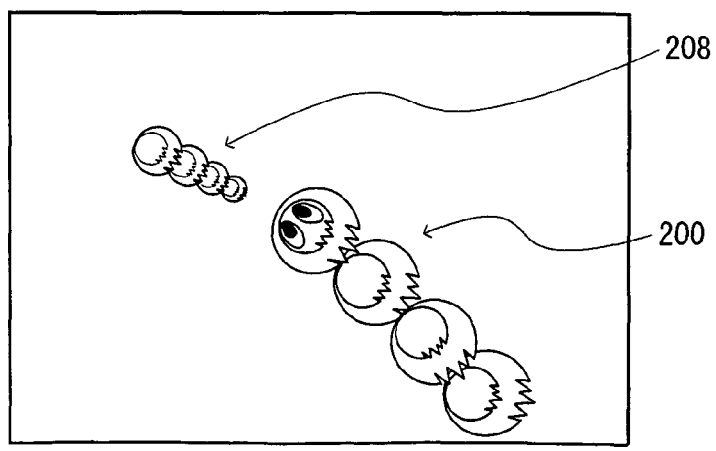

Moreover, when other enemy objects 202 are further connected after that, the ability of the player object 200 is changed in accordance with the connection pattern of the kinds of the plurality of enemy objects 202. In this embodiment, for example, the ability of the player object 200 is raised to a higher level by the consecutive connections with the enemy objects 202 of the same kind, that is, according to the number of the consecutively connected enemy objects 202 of the same kind. FIG. 9 (A) shows the player object 200 formed with the consecutively connected two enemy objects 202 of insect. The method of attack used by the player object 200 of insect (level 2) is discharge of the medium-length thread 204, and its power of attack is at a medium level. FIG. 9 (B) illustrates the player object 200 of water at level 2. The water's method of attack is generation of bubbles, and its initial power of attack is of low level. Thus, the player object 200 at level 2 shown in FIG. 9 (B) attacks its enemy by spouting out a medium number of bubbles 206 in a forward direction, and its power of attack is at a medium level. In addition, FIG. 9 (C) depicts the player object 200 of fire with three consecutive connections. The fire's method of attack is the emission of fire, and its initial power of attack is at a low level. Accordingly, the player object 200 at level 3 attacks its enemy by emitting in a forward direction intense fire with high power of attack (represented by four fireballs) 208.

In this embodiment, the ROM 28a stores in advance a table of correspondence between the connection patterns by kind of the enemy objects 202 and the abilities to be given to the player object 200. Ability setting is carried out on the basis of the table.

As mentioned above, the ability of the player object 200 is changed in accordance with the connection patterns of the kinds of a plurality of connected enemy objects 202, which enhances the game's strategic characteristics and also adds to the game a puzzle game-like pleasure, such as finding an appropriate connection pattern by trial and error for a more special or strong ability.

Returning to FIG. 4, a storage area 88 stores a movement state determination program. By this program, the movement state of the player object 200 is assessed. In this embodiment, the requirement for separating the connected player object 200 is that the player object 200 is moved in a predetermined state. By the movement state determination program, it is determined whether this separation requirement is satisfied or not. In this embodiment, the separation requirement is that the player object 200 is rapidly moved or is shaken. That is, one separation requirement is the rapid movement of the game apparatus 10 itself. More specifically, it is determined whether the movement speed of the player object 200 calculated on the basis of the input information from the mouse cartridge 36 (namely, the movement information of the game apparatus 10) is equal to or more than a predetermined threshold value (e.g. 30 dots/frame). In addition, the other separation requirement is the shaking of the game apparatus 10 itself. More specifically, it is determined whether or not the event that the movement direction of the player object 200 makes a difference in angle of predetermined value (e.g. 60 degrees) or more with the immediately preceding movement direction thereof has been detected a given number of times (e.g. six times) or more within a given length of time (e.g. 1.5 seconds).

Figure 10:
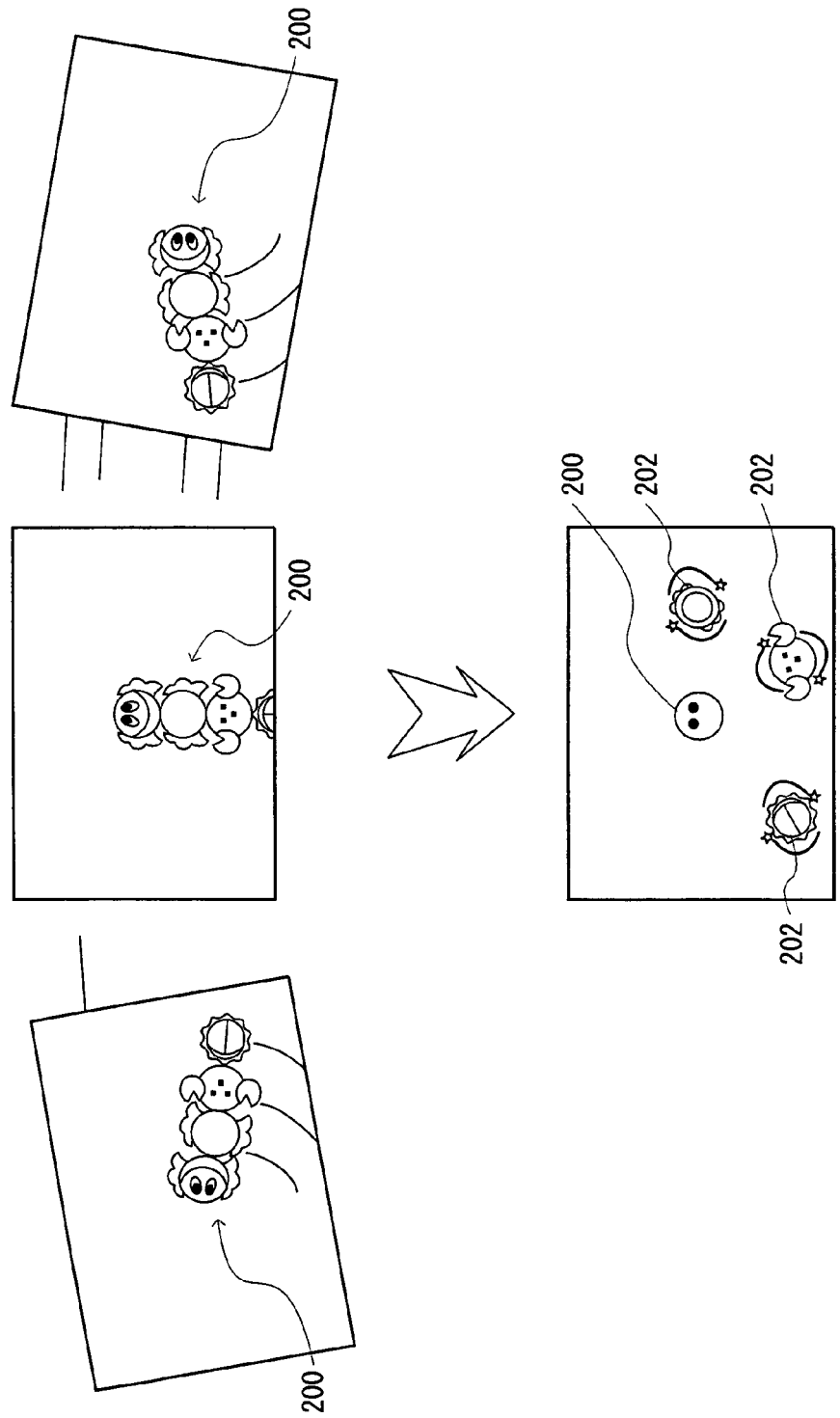
FIG. 10 is an illustrative view showing a scene in which a player object formed by a plurality of parts is being separated.

A storage area 90 stores a separation program. When it is determined that any of the above mentioned separation requirements has been satisfied, the separation program allows the connected player object 200 to be separated. That is, the player object 200 formed by a plurality of parts (the initial object 200 and one or more connected enemy objects 202) is disconnected and separated into the plurality of parts. More specifically, as shown in FIG. 10, when the game apparatus 10 is moved at a predetermined speed or more or is shaken, the connected player object 200 is separated into the initial player object 200 and the enemy objects 202 in the unconscious state. In this manner, the player object can be taken apart by an intuitive operation, achieving a highly interesting game. This also offers a novel game requiring a player to perform a careful operation. Further, in this embodiment, the movement of the player object 200 is controlled on the basis of the input information from the mouse cartridge 36, that is, the player object 200 is separated according to the movement of the game apparatus 10 itself. As a consequence, it is possible to accomplish a highly entertaining game in which the separation of the player object 200 can be controlled by the extremely intuitive operation.

After the separation, the player can operate only the initial player object 200 as in the case of before the connection. The separated enemy objects 202 are controlled by the control program again. Thus, the separation of the player object 200 into a plurality of parts will not make the player's operation troublesome.

In addition, the displaying manner of the separated player object 200 is changed from the connected state, and the player object 200 is displayed by an image indicative of the initial player object 200 not belonging to any kind. This allows the player to easily identify the operable player object 200 after the separation and know that the operable object is now the initial player object 200 alone.

After the separation, the ability of the player object 200 is changed from the connected state to the initial state, for example. As above, the ability is changed between before and after the separation, which brings about enhancement in the game's strategic characteristics.

Returning to FIG. 4, a storage area 92 of the data storage area 72 stores image data for producing a game screen. This area stores image data indicating the initial states and connected states, etc. of the player object 200 (of individual kinds), and stores image data indicating the initial states, connected states and unconscious states of the enemy objects 202 of individual kinds.

A storage area 94 stores player object data which indicates initial values of information relating to the control and display, etc. of the player object 200. For example, those include the initial values of kind, ability, HP (hit points: physical strength or life duration), image designation, position and orientation, etc. in the game space.

A storage area 96 stores enemy object data which indicates initial values of information relating to the control and display, etc. of a plurality of kinds of enemy objects 202. For example, those include the initial values of kind, ability, HP, and image designation, etc. Further, for the enemy object 202 with a weak point, data indicative of the collision effective portion (position, scope, etc.) is also stored in this area.

A storage area 98 stores a connected ability table. Registered in the connected ability table are abilities to be given to the player object 200 in association with the connection patterns of the kinds of the enemy objects 202. More specifically, FIG. 5 shows correspondence between the connection patterns related to the kind and number of consecutive connections (level) and the abilities related to the method of attack and the power of attack. For instance, if the kind is "insect" and the number of consecutive connection is "1", the method of attack used by the connected player object 200 is set to "short thread", and its power of attack is set to "low level" (the value for causing minor damage). If the kind is "insect" and the number of consecutive connections is "2", the method of attack is set to "medium-length thread" and the power of attack is set so as to cause "medium-level" damage. If the kind is "insect" and the number of consecutive connections is "3", the method of attack is set to "long thread" and the power of attack is set to "high level". The number of consecutive connections means the number of the consecutively connected enemy objects 202 of the same kind. Thus, as stated above, by consecutively connecting the enemy objects 202 of the same kind, it is possible to raise the ability of the player object 200 to a higher level. The level of the ability given to the player object 200 may not be raised according to the number of the consecutively connected enemy objects 202 of the same kind, and may be increased by connecting a plurality of kinds of enemy objects 202 in predetermined order. In this case, the ability to be given to the player object 200 is registered in the connected ability table in association with the connection pattern indicating the connection order of a plurality of kinds of enemy objects.

Returning to FIG. 4, a storage area 100 stores a target connection pattern. This data indicates the order or combination of connection of a plurality of kinds of enemy objects 202. When the player object 200 is formed with a specific connection pattern matching or satisfying the target connection pattern, the game processing is changed so as to clear the game. As above, the game processing is changed according to the connection pattern of the kinds of a plurality of enemy objects 202, which further improves the game's strategic characteristics and offers to the player a puzzle game-like pleasure such as finding an appropriate connection pattern by trial and error. In this embodiment, moreover, ability setting is carried out according to the connection pattern, which makes it possible to realize a highly strategic and pleasurable game in which the player tries to clear the game while giving an appropriate ability to the player object 200 in accordance with the progress of the game.

FIG. 6 shows one example of memory map of the RAM 48. This drawing presents only a part of the memory map, and the RAM 48 stores other necessary data in addition to those shown there.

A storage area 102 stores input information acquired by the input information acquisition program. The input information includes the mouse input information, that is, the movement information of the game apparatus 10 detected by the mouse cartridge 36 (movement direction, movement amount and movement speed, etc.). The input information also includes the operation information of the operating switch 20 and the operation information detected by the touch panel 22.

A storage area 104 stores the historical record of movement information of the player object 200. The movement information of the player object 200 includes the movement direction, movement distance and movement speed, etc. of the player object 200 calculated by the player object movement control program on the basis of the mouse input information (namely, the movement information of the game apparatus 10), and this storage area stores the historical record of the movement information in correspondence with time (frame number). The storage area 104 stores a predetermined number of frames of movement information, tracing back from the current frame.

A storage area 106 stores player object control data. The player object control data includes information on the position (coordinates) in the game space, HP, kind, and ability etc. of the player object 200. This area also stores connection state information of the player object 200, which includes the number of connections (total number of the connected enemy objects 202) and the order of connection (the identification information (or the kind) of the first enemy object 202, . . . , the identification information (or the kind) of the n-th enemy object 202), etc.

A storage area 108 stores enemy object control data which includes information on the position (coordinates) in the game space, HP, state, and unconscious time etc. of each of the enemy objects 202. The state information indicates whether the enemy object 202 exists independently or constitutes a part (connected body) of the player object 200.

Figure 11:
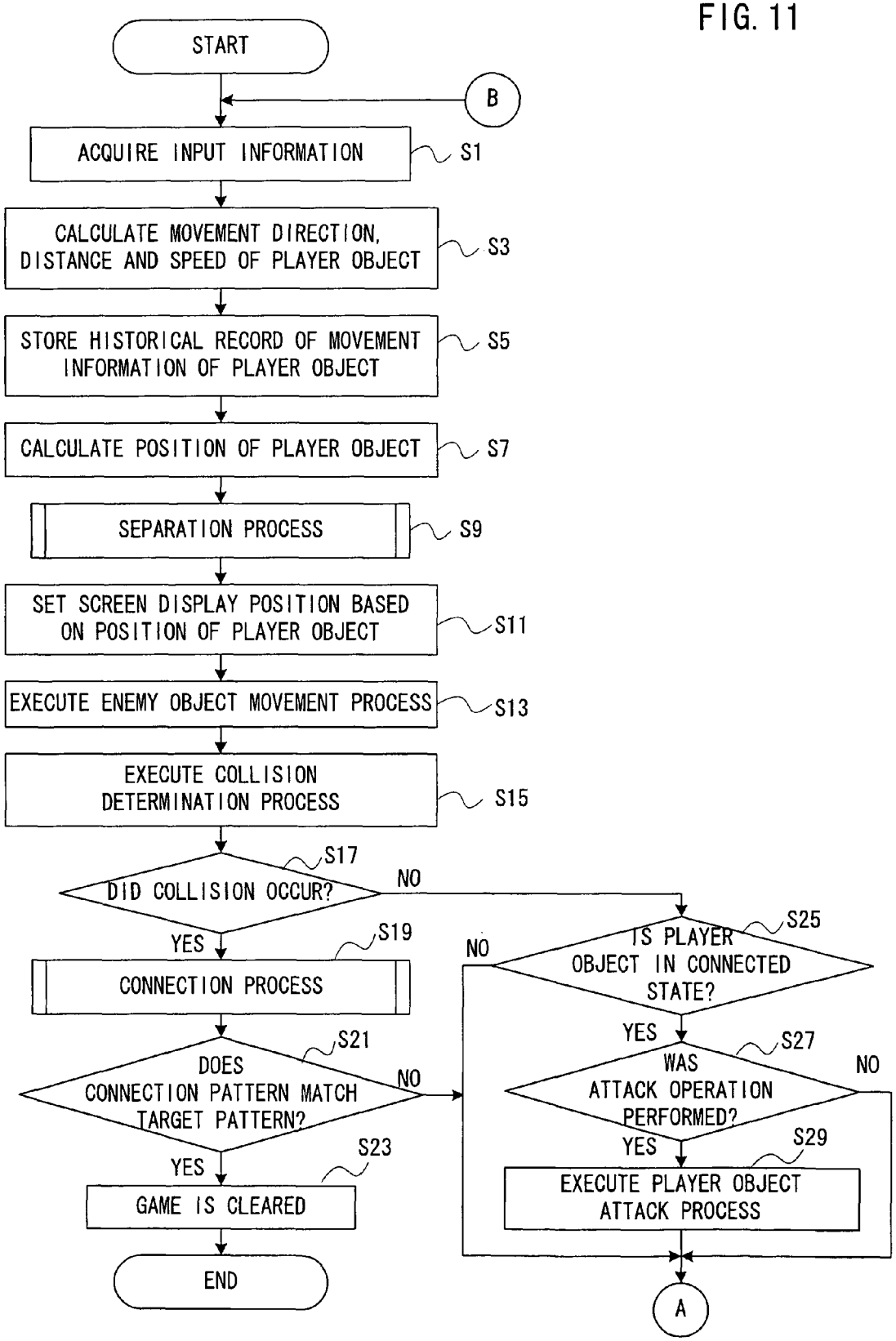
FIG. 11 is a flowchart showing a part of one example of operation of the game apparatus in FIG. 1 embodiment.
Figure 12:
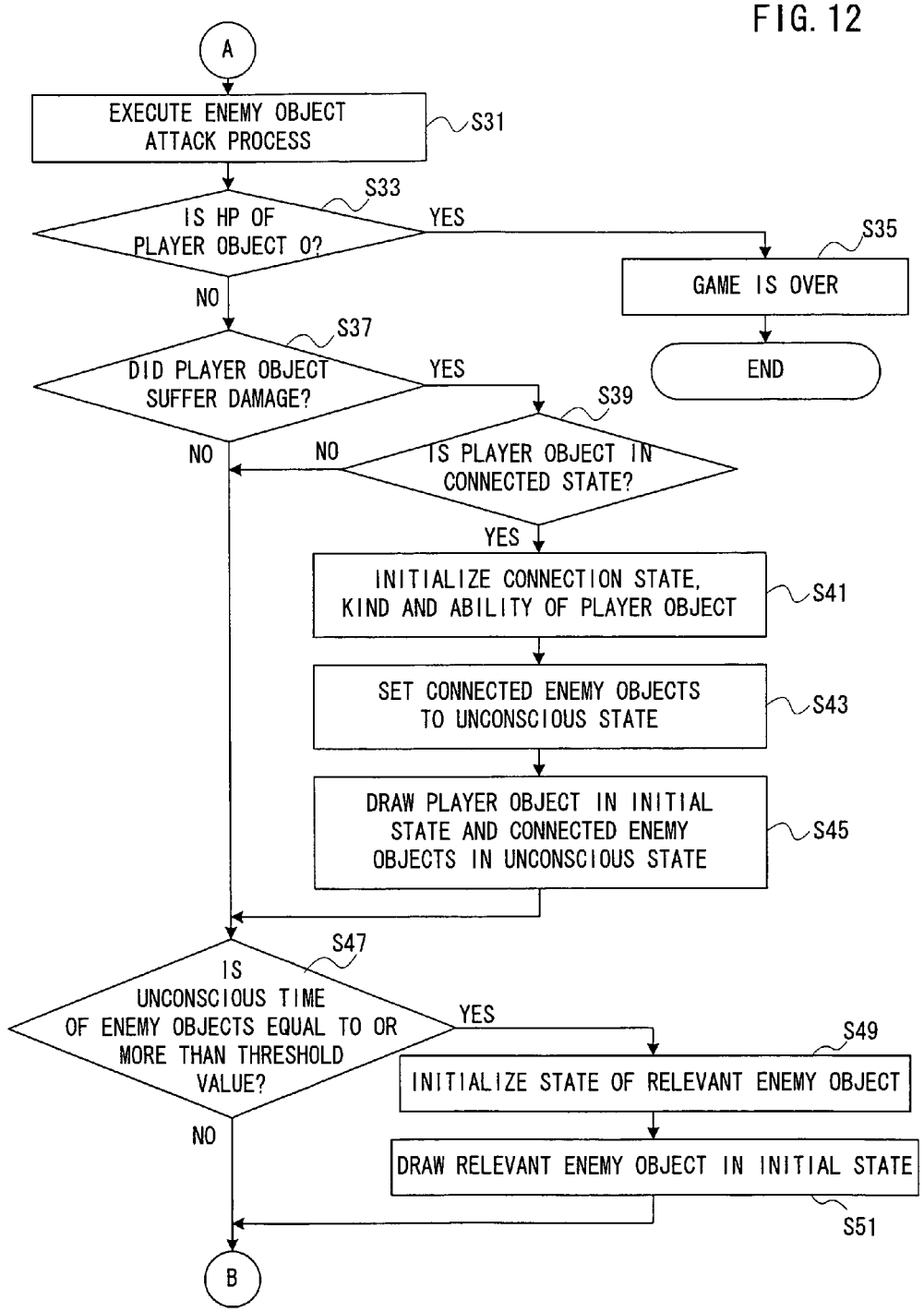
FIG. 12 is a flowchart continued from FIG. 11.

FIG. 11 and FIG. 12 show one example of game operation of CPU core 34 of the game apparatus 10. When starting the process, in a step S1, the CPU core 34 firstly acquires the mouse input information from the mouse cartridge 36 and stores it in a storage area 102 of the RAM 48. The CPU core 34 also obtains the operation information from the operating switch 20 and the operation information from the touch panel 22 via the I/F circuit 54, and stores them in the storage area 102.

Then, in a step S3, the CPU core 34 calculates the movement direction, movement distance and movement speed etc. of the player object 200 based on the input information (the mouse input information in this embodiment). Subsequently, in a step S5, the CPU core 34 stores the historical record of the movement information of the player object 200 in a storage area 104 of the RAM 48. More specifically, the CPU core 34 adds to the storage area 104 the movement direction, movement distance and movement speed etc. calculated in the step S3.

Next, in a step S7, the CPU core 34 calculates the position (coordinates) of the player object 200 based on the current position and movement information etc. thereof, and stores the coordinates in position information in a storage area 106, thereby updating the position information. At the same time, the orientation of the player object 200 is also calculated and updated.

Then, in a step S9, the CPU core 34 executes a separation process. In the separation process, the player object 200 formed by a plurality of parts, that is, connected with a plurality of parts, is separated. One example of operation of the separation process is presented in FIG. 15, and will be explained after the description of the connection process because the separation is carried out after the connection in this embodiment.

Upon completion of the step S9, the CPU core 34 sets a screen display position based on the position of the player object 200 in a step S11. In this embodiment, since the player object 200 is configured as to be always displayed at the center of the screen, the display position (display range in the game space) is calculated so that the player object 200 is located at the center of the screen.

In a step S13, the CPU core 34 executes an enemy object movement process to calculate the positions (coordinates) etc. of all the enemy objects 202 existing in the game space and update the position information in the storage area 108.

Subsequently, in a step S15, the CPU core 34 executes a collision determination process of the player object 200 and the enemy object 202, based on the position information of the player object 200 and the position information of the enemy object 202. Then, in a step S17, the CPU core 34 determines from result of the determination whether or not it is concluded that the player object 200 has collided with any of the enemy objects 202.

If "YES" in the step S17, the CPU core 34 executes a connection process in a step S19. In the connection process, the player object 200 is connected with the collided enemy object 202 if the enemy object 202 is in the unconscious state. On the other hand, when it is determined the unconsciousness requirement is satisfied even though the collided enemy object 202 is not in the unconscious state, the enemy object 202 is turned into the unconscious state. One example of operation of the connection process is presented in FIG. 13 and FIG. 14.

Upon completion of the step S19, the CPU core 34 determines in a step S21 whether the connection pattern constitutes the target pattern or not. More specifically, the CPU core 34 determines whether or not the connection pattern of the enemy object 202 matches the target connection pattern, based on the connection state information in the storage area 106 and the target connection pattern in the storage area 100. If "YES" in the step S21, that is, if the game-is-cleared requirement is satisfied, the CPU core 34 changes the game processing with procedure of connection, attack and separation etc., and executes a game-is-cleared process in a step S23 to terminate the game processing. The game-is-cleared process is carried out in such a manner that a change will be made to the subsequent game processing, whereby it becomes possible to proceed to the next stage or some hidden stage, for example. If "NO" in the step S21, this means that the game-is-cleared requirement is satisfied and thus the process moves to a step S31 shown in FIG. 12 for continuation of the game.

If "NO" in the step S17, that is, if the player object 200 and the enemy object 202 have not collided with each other, the CPU core 34 determines in a step S25 whether the player object 200 is in the connected state or not, based on the connection state information in the storage area 106. If "YES" in the step S25, that is, if the player object 200 is in the connected state, the CPU core 34 determines in a step S27 whether the player has carried out an attack operation or not, based on the operation information in the storage area 102. In this embodiment, the determination about the feasibility of an attack is made in the steps S25 and S27 because the player can make an attack by operating the A button 20*d*, for example, when the player object 200 is in the connected state.

If "YES" in the step S27, the CPU core 34 executes a player object attack process in a step S29. This allows the player object 200 to attack its enemy according to the provided ability. Since the player object 200 is given the ability by connection with the enemy object 202 in a connection process described later, the player object 200 launches an attack by the method and with the power according to the ability as shown in FIG. 9. When the attack hits the enemy object 202, the enemy object 202 suffers damage corresponding to these method and power of attack, and then its HP is decremented. When its HP becomes 0, the enemy object 202 disappears from the game space, and the control data of the enemy object 202 is deleted from the storage area 108. Alternatively, the enemy object 202 whose HP has become 0 may be turned into a predetermined state (unconscious state), without disappearing from the game space. Upon completion of the step S29, the process moves to a step S31 of FIG. 12. If "NO" in the step S27 or if "NO" in the step S25, the process goes directly to the step S31.

In the step S31 of FIG. 12, the CPU core 34 executes an enemy object attack process. This allows the enemy object 202 in the game space to attack the player object 200 as necessary. The enemy object 202 makes an attack on the basis of its ability, that is, its method of attack and power of attack. When the attack hits the player object 200, the player object 200 is damaged and its HP is decreased. In a succeeding step S33, the CPU core 34 determines whether the HP of the player object 200 has become zero or not, and if "YES", the CPU core 34 executes a game-is-over process in a step S35 to terminate this game processing.

On the other hand, if "NO" in the step S33, the CPU core 34 determines in a step S37 whether the player object 200 has suffered any damage from the enemy's attack or not. If "YES" in the step S37, the CPU core 34 determines in a succeeding step S39 whether the player object 200 is in the connected state or not, based on the connection state information in the storage area 106. In this embodiment, the determination is made about the possibility of disconnection in the steps S37 and S39 because the player object 200 in the connected state is configured as to be disconnected when it suffers damage.

If "YES" in the step S39, the CPU core 34 initializes the connection state, kind and ability of the player object 200 in a step S41. The information items relating to the connection state, kind and ability, etc. in the storage area 106 is returned to the initial values in the storage area 94 because these items have been changed in a connection process described later when the player object 200 has been connected with the enemy object 202.

In a step S43, the CPU core 34 turns each of the connected enemy objects 202 to the unconscious state. In this embodiment, more specifically, the information on the state of the enemy objects 202 in the storage area 108 is changed to unconscious because each of the connected enemy objects 202 is configured as to be returned to the unconscious state when it is separated from the player object 200. At the same time, although a description is not provided in the flowchart, the CPU core 34 starts a process of measuring the time during when each of the enemy object 202 remains in the unconscious state. This updates the information on the unconscious time of the relevant enemy objects 202 in the storage area 108 at intervals of regular time (e.g. one frame).

In a step S45, the CPU core 34 uses the GPU 50 or the GPU 52 to draw in the VRAM 58 or the VRAM 60 the player object 200 by the initial state image data and the connected enemy objects 202 by the unconscious state image data. Accordingly, when the LCD controller 56 updates the screen display, the LCD 12 or the LCD 14 display the game screen in which the player object 200 is disconnected and returned into the initial state and the enemy objects 202 are returned to the unconscious state.

Upon completion of the step S45 or if "NO" in the step S37 or S39, the CPU core 34 determines in a step S47 whether or not the unconscious time of the enemy objects 202 has reached a predetermined threshold value or more, based on the information on the unconscious time of the enemy objects 202 in the storage area 108. In this embodiment, the determination is made about the termination of unconsciousness in the step S47 because the enemy objects 202 is configured as to be in the unconscious state for a limited length of time.

If "YES" in the step S47, that is, if the enemy object 202 has been in the unconscious state for the given length of time, in the step S49, the CPU core 34 initializes the state of the relevant enemy object 202, and stores the information indicating the initial independent state of the relevant enemy object 202 in the storage area 108. In a step S51, the CPU core 34 also uses the GPU 50 or 52 to draw the relevant enemy object 202 in the VRAM 58 or the VRAM 60 by individual initial state image data. Consequently, when the LCD controller 56 updates the screen display, the relevant enemy objects 202 are displayed in the initial state on the LCD 12 or the LCD 14.

Upon completion of the step S51 or if "NO" in the step S47, the process returns to the step S1 of FIG. 11. In this manner, the game processing shown in FIG. 11 and FIG. 12 is repeated to make the game proceed at intervals of regular time (one frame) until it is determined that the game-is-cleared requirement (S21) or the game-is-over requirement (S33) has been satisfied.

Figure 13:
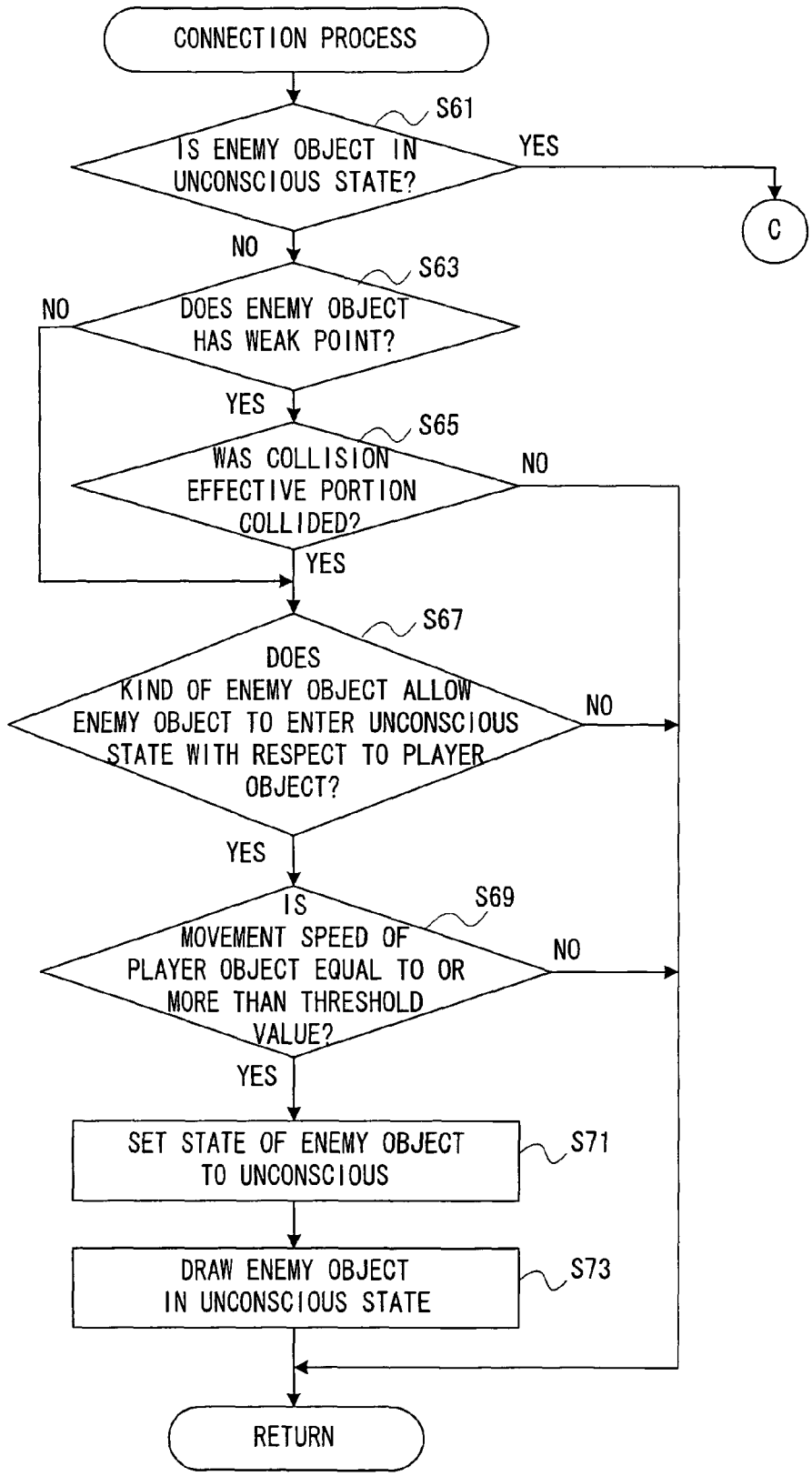
FIG. 13 is a flowchart showing a part of one example of operation of a connection process described in FIG. 11.
Figure 14:
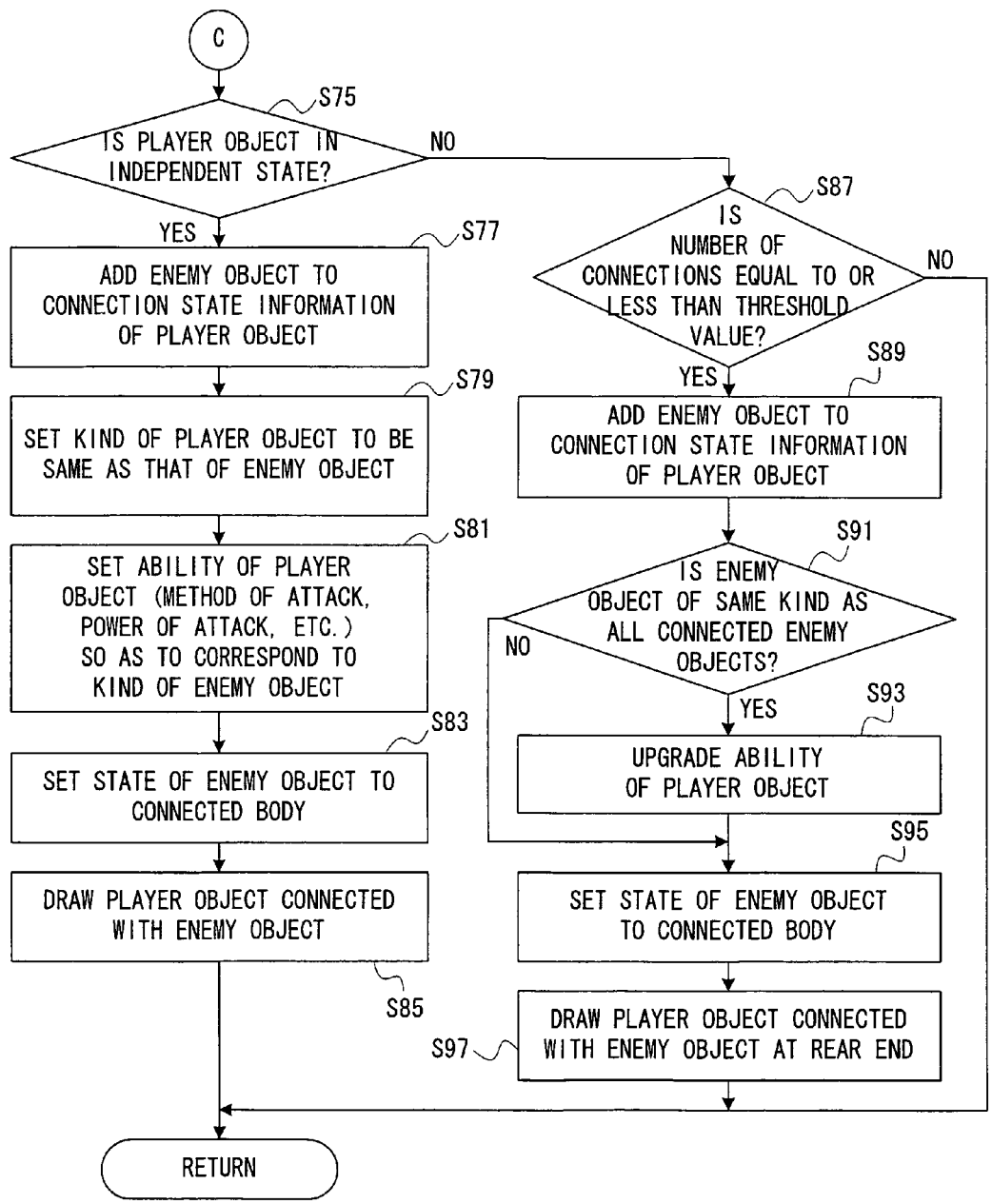
FIG. 14 is a flowchart continued from FIG. 13.

One example of operation of the connection process in the step S19 of FIG. 11 is described in FIG. 13 and FIG. 14. In a step S61, firstly, the CPU core 34 determines whether the collided enemy object 202 is in the unconscious state or not, based on the state information of the enemy object 202 stored in the enemy object control data storage area 108.

If "NO" in the step S61, that is, if the enemy object 202 not in the unconscious state is collided as shown in FIG. 7, the CPU core 34 determines in a step S63 whether the enemy object 202 has a weak point or not, based on the weak point information of the enemy object 202 stored in the storage area 96. If "YES" in the step S63, the CPU core 34 determines in a succeeding step S65 whether the enemy object 202 has been collided at its collision effective portion or not, based on the collision effective portion information in the storage area 96. If "YES" in the step S65, that is, the enemy object 202 with a weak point has been collided at its weak point, the process moves to a step S67. If "NO" in the step S63, that is, if the enemy object 202 with no weak point has been collided, the process proceeds directly to the step S67.

If "NO" in the step S65, that is, if the enemy object 202 with a weak point has been collided at a portion other than the weak point, the unconsciousness requirement is not satisfied, and thus the CPU core 34 terminates the connection process and returns to the step S21 of FIG. 11.

In a step S67, the CPU core 34 determines whether the enemy object 202 is of the kind which can bring it to the unconscious state with respect to the player object 200, based on the above mentioned compatibility information stored in the data storage area 72 of the ROM 28a. If "YES" in the step S67, that is, if the enemy object 200 of the compatible kind has been collided, the process moves to a step S69. If "NO" in the step S67, the unconsciousness requirement is not satisfied, and thus the CPU core 34 terminates the connection process and returns to the step S21 of FIG. 11.

In a succeeding step S69, the CPU core 34 determines whether or not the movement speed of the player object 200 is equal to or more than a predetermined threshold value. If "NO" in the step S69, that is, if the player object 200 collides with the enemy object 202 at a slow speed, the unconsciousness requirement is not satisfied, and thus the CPU core 34 terminates the connection process and returns to the step S21 of FIG. 11.

On the other hand, if "YES" in the step S69, that is, if the player object 200 has moved quickly and collided with the enemy object 202, the unconsciousness requirement is satisfied and thus the enemy object 202 enters to the unconscious state. That is, the CPU core 34 turns the enemy object 202 in the storage area 108 into the unconscious state in a step S71. Although not described in FIG. 13, as well as turning the enemy object 202 into the unconscious state, the CPU core 34 starts to measure the unconscious time of the enemy object 202.

Then, in a step S73, the CPU core 34 draws the enemy object 202 using the image data indicative of unconscious state. Accordingly, when the LCD controller 56 updates the screen, the unconscious enemy object 202 is displayed on the screen as shown in the lower part of FIG. 7. Upon completion of the step S73, the CPU core 34 terminates the connection process and returns to the step S21 of FIG. 11.

On the other hand, if "YES" in the step S61, that is, if the unconscious enemy object 202 has been collided as shown in the upper part of FIG. 8, the CPU core 34 moves the process to a step S75 of FIG. 14 for connection of the enemy object 202 to the player object 200.

In the step S75 of FIG. 14, the CPU core 34 determines whether the player object 200 is in the independent state or not, based on the connection state information in the storage area 106. If "YES" in the step S75, that is, if the unconnected player object 200 has collided with the enemy object 202, the CPU core 34 stores the identification information (or the kind) of the enemy object 202 in the first area for connection state information of the player object 200 in the storage area 106. Although not shown in FIG. 14, the CPU core 34 also stores the value "1" as information indicative of the number of connection.

In a subsequent step S79, the CPU core 34 sets the kind of the player object 200 so as to be the same as the enemy object 202. More specifically, the CPU core 34 refers to the kind information of the enemy object 202 in the storage area 96 to store the kind information of the player object 200 in the storage area 106.

Further, in a step S81, the CPU core 34 sets the ability of the player object 200 so as to correspond to the kind of the enemy object 202. More specifically, the CPU core 34 refers to the connected ability table in the storage area 98 to store in the storage area 106 the ability with the number of connection of 1 (the method of attack and the power of attack, etc.) corresponding to the kind of the enemy object 202, as the ability information of the player object 200.

In a step S83, the CPU core 34 sets the state of the enemy object 202 to connected body, that is, stores the information indicative of connected body in the state information of the enemy object 202 in the storage area 108. Although not shown in FIG. 14, the CPU core 34 ends measurement of the unconscious time of the enemy object 202 and clears the information on the unconscious time.

Then, in a step S85, the CPU core 34 draws the player object 200 connected with the enemy object 202. Accordingly, when the LCD controller 56 updates the screen, the screen shows the player object 200 that is of the same kind as the collided enemy object 202 and is connected with the enemy object 202 at the rear end or somewhere, as shown in the middle part of FIG. 8. Upon completion of step S85, the CPU core 34 terminates the connection process and returns to the step S21 of FIG. 11.

On the other hand, if "NO" in the step S75, that is, if the player object 200 is in the connected state, the CPU core 34 determines in a step S87 whether the number of connection(s) stored in the storage area 106 is less than a predetermined threshold value or not. In this embodiment, it is determined in the step S87 whether the maximum number of connections has not been reached because an upper limit is set for the number of connectable enemy objects 202, and the process of step S87 may not be omitted in other embodiments. If "NO" in the step S87, that is, if the number of connections has reached the maximum value, the CPU core 34 directly terminates the connection process and moves to a step S21 of FIG. 11.

If "YES" in the step S87, that is, if the maximum number of connections has not been reached, in a step S89, the CPU core 34 adds the enemy object 202 to the connection state information of the player object 200 in the storage area 106. More specifically, the CPU core 34 updates the number of connections and stores the identification information (or the kind) of the enemy object 202 in the order corresponding to the updated number of connections.

Then, in a step S91, the CPU core 34 determines whether or not the enemy object 202 is of the same kind as all the already connected enemy objects 202. If "YES" in the step S91, the CPU core 34 upgrades the ability of the player object 200 in a step S93. More specifically, the CPU core 34 reads out the information on the ability corresponding to the current connection pattern and updates the ability information of the player object 200 in the storage area 106, based on the connected ability table in the storage area 98. In this manner, the ability of the player object 200 is changed according to the connection pattern of the kinds of the connected enemy objects 202. If "NO" in the step S91, that is, if the connected enemy objects 202 are not of the same kind, the level of the ability will not be raised in this embodiment, and thus the process goes directly to a step S95.

Subsequently, in the step S95, the CPU core 34 stores the information indicative of connected body in the state information of the enemy object 202 in the storage area 108.

Then, in a step S97, the CPU core 34 draws the player object 200 connected at the rear end with the enemy object 202. Therefore, when the LCD controller 56 updates the screen, the player object 200 connected at the rear end with the collided enemy object 202 is displayed on the screen (refer to FIG. 9). Upon completion of the step S97, the CPU core 34 terminates the connection process and returns to the step S21 of FIG. 11.

Figure 15:
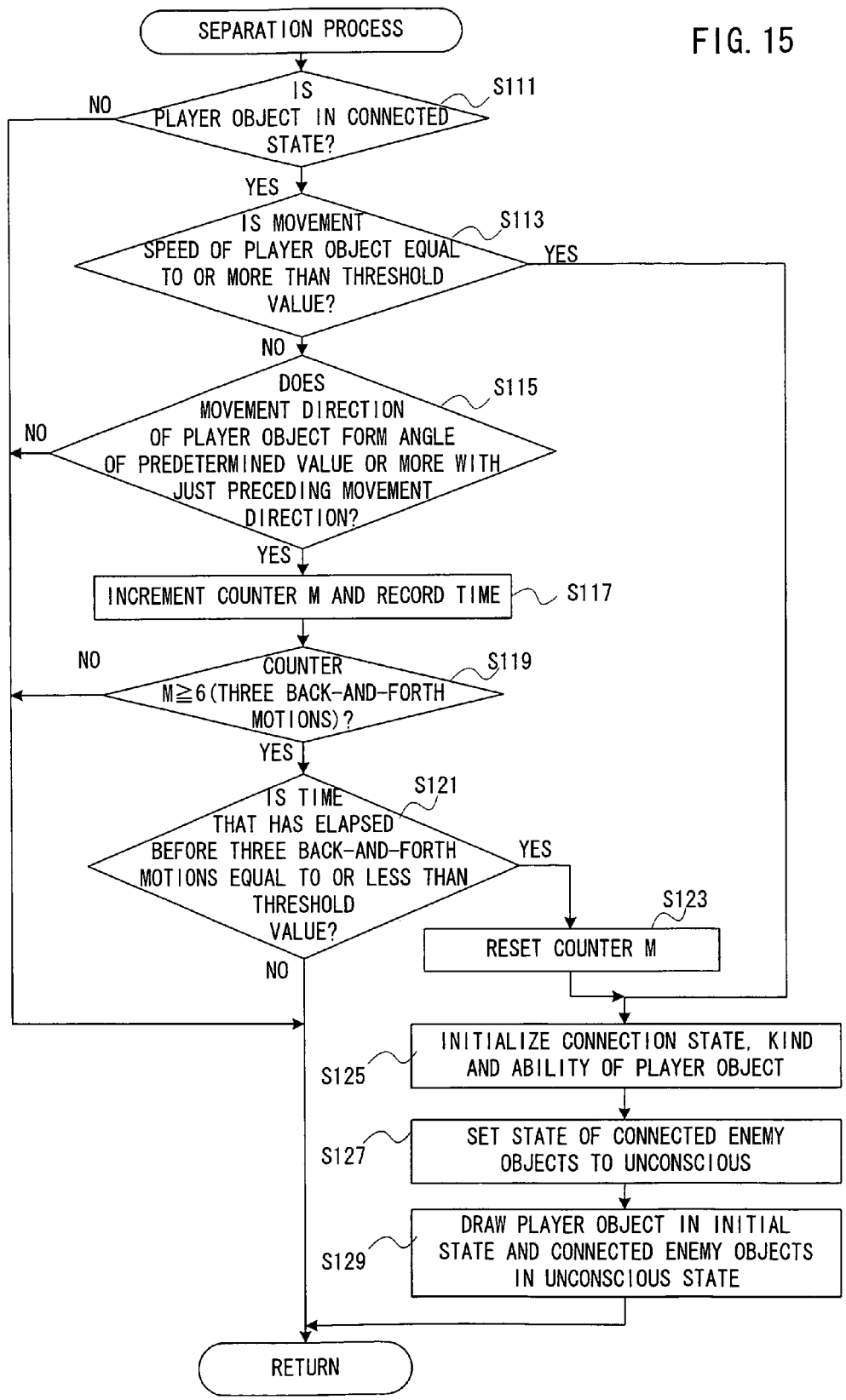
FIG. 15 is a flowchart showing one example of operation of a separation process.

One example of operation of the separation process in the step S9 of FIG. 11 is shown in FIG. 15. When starting the separation process, the CPU core 34 firstly determines in a step S111 whether the player object 200 is in the connected state or not, based on the connection state information in the storage area 106. If "NO" in the step S111, that is, if the player object 200 is in the independent state (the number of connection is 0), there exists no enemy object 202 to be separated, and the CPU core 34 thus terminates the separation process and returns to the step S11 of FIG. 11.

On the other hand, if "YES" in the step S111, that is, if the player object 200 is in the connected state, the CPU core 34 makes a determination on a movement state. More specifically, the CPU core 34 firstly determines in a step S13 whether or not the movement speed of the player object 200 is equal to or more than a predetermined threshold value. If "YES" in the step S113, that is, if the separation requirement has been satisfied by quick movement of the game apparatus 10, the CPU core 34 goes to a step S125 to execute a separation process.

If "NO" in the step S113, the CPU core 34 makes a determination on another movement state, that is, a determination on separation requirement (shaking). More specifically, the CPU core 34 determines in a step S115 whether the movement direction of the player object 200 forms an angle of a predetermined value or more with respect to the immediately preceding movement direction, based on the historical record of the movement direction out of the movement information stored in the storage area 104. If "NO" in the step S115, the game apparatus 10 is not shaken, and the CPU core 34 thus terminates the separation process and returns to the step S11 of FIG. 11.

On the other hand, if "YES" in the step S115, the CPU core 34 increments the value of a counter M stored in the RAM 48 (addition of 1) and stores the current time (frame number) in a step S117. Besides, the counter M has an initial value of 0, and the value of the counter M is stored in the RAM 48 together with the time of initial setting or resetting (frame number).

Subsequently, in a step S119, the CPU core 34 determines whether or not the value of the counter M is equal to or more than a predetermined value. That is, the CPU core 34 determines whether or not the changing of the movement direction at an angle of a predetermined value or more has been detected a predetermined number of times or more. In this embodiment, the threshold value for determination on the value of the counter M is set to 6, for example, that is, the CPU core 34 determines whether or not the game apparatus 10 has moved in the back-and-forth direction at least three times. If "NO" in the step S119, that is, if it does not conclude that the game apparatus 10 has been shaken, the CPU core 34 terminates the separation process.

On the other hand, if "YES" in the step S119, that is, if the changing of movement direction at an angle of a predetermined value or more has been detected at least a predetermined number of times (six in this embodiment), the CPU core 34 determines in a step S121 whether or not the time elapsed before the game apparatus 10 has made a predetermined number of back-and-forth motions (three in this embodiment) is equal to or less than a predetermined threshold value or less. More specifically, the CPU core 34 determines whether a difference between the current time and the time stored in association with a value obtained by subtracting a predetermined value from the value of the counter M at the current time (6−1=5 in this embodiment) is equal to or less than a predetermined value (e.g. 90 frames). If "NO" in the step S121, that is, if it does not concludes that the game apparatus 10 has been shaken, the CPU core 34 terminates the separation process.

On the other hand, if "YES" in the step S121, that is, if the separation requirement has been satisfied by shaking the game apparatus 10, the CPU core 34 resets the counter M in the RAM 48 in a step S123. The CPU core 34 also clears the time stored in association with the value of the counter M and stores the current time in association with the initial value 0 of the counter M.

Subsequently, in a step S125, the CPU core 34 initializes the information on the connection state, kind and ability of the player object 200 stored in the storage area 106. In a step S127, the CPU core 34 sets the state information of the connected enemy objects 202 to unconscious. Although not shown in FIG. 15, the CPU core 34 starts to measure the time during when the enemy object 202 remains in the unconscious state with respect to each enemy object 202 reset to the unconscious state. Further, in a step S129, the CPU core 34 draws the player object 200 by an initial state image and draws the connected enemy objects 202 by unconscious state images. Accordingly, when the LCD controller 56 updates the screen, the game screen displays the initial unconnected player object 200 and the unconscious enemy objects 202, as shown in FIG. 10. Upon completion of the step S129, the CPU core 34 terminates the separation process and returns to the step S11 of FIG. 11.

According to this embodiment, the player object 200 is separated into a plurality of parts when the movement state of the player object 200 has satisfied a predetermined requirement. Thus, this makes it possible to allow the player to separate the player object 200 by an intuitive operation and add interest to the operation of the player object 200 formed by a plurality of parts.

In the above described embodiment, the movement of the player object 200 is controlled on the basis of the input information from the mouse cartridge 36. In other embodiments, the movement of the player object 200 may be controlled on the basis of the operation information from the touch panel 22. For instance, the player object 200 may be moved on the basis of the direction, length and movement distance per unit of time of a path input into the touch panel 22, instead of on the basis of the movement direction, movement distance and movement speed detected by the mouse cartridge 36. In this case, the connection and separation of the player object 200 can be controlled by intuitive operations, as in the case with the use of the mouse cartridge 36.

Besides, in another embodiment, the game apparatus 10 or the cartridge 36 or the like may be provided with an acceleration sensor so that the player object 200 is separated into a plurality of parts 200, 202 when it is determined that the orientation or motion or the like of the game apparatus 10 detected on the basis of information from the acceleration sensor has satisfied a predetermined requirement, or the movement state etc. of the player object 200 according to the orientation or motion or the like of the game apparatus 10 has satisfied a predetermined requirement.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory storage medium storing a game program for a game apparatus equipped with an input device receiving input information in accordance with a player's operation and a display device including a game screen showing a player object connected to one or more parts wherein said game program allows at least one processor of said game apparatus to serve as:
    a movement control logic unit that controls the movement of said player object based on said input information from said input device;
    a movement state determination logic unit that determines whether a movement state of said player object has satisfied a requirement or not;
    a separation logic unit that separates said player object from said one or more parts when said movement state determination logic unit determines that said requirement has been satisfied, and
    a display image generator which generates an image of the player object and the one or more parts, wherein the one or more parts are shown being separated from the player object.

2. A storage medium storing a game program according to claim 1, wherein said movement control logic unit includes a movement speed calculation logic unit that calculates a movement speed of said player object, and
    said requirement is that said movement speed calculated by said movement speed calculation logic unit is equal to or more than a value.

3. The non-transitory storage medium storing a game program according to claim 1, wherein said movement control logic unit includes a movement direction calculation logic unit which calculates a movement direction of said player object, and
    said requirement is that an event where a difference of an angle between said movement direction calculated by said movement direction calculation logic unit and an immediately preceding movement direction is equal to or more than a value has been detected a number of times or more within a given length of time.

4. The non-transitory storage medium storing a game program according to claim 1, wherein said movement control logic unit controls movement of said player object after being separated by said separation logic unit based on said input information from said input device, and controls movement of the parts after being separated by said separation logic unit as non-player objects.

5. The non-transitory storage medium storing a game program according to claim 4, wherein said game program allows said processor to further include a display manner change logic unit which changes a display manner of the player object after being separated by said separation logic unit.

6. The non-transitory storage medium storing a game program according to claim 1, wherein said game program allows said processor to further include an ability change logic unit which changes an ability of said player object after being separated by said separation logic unit.

7. A game apparatus equipped with an input device receiving input information in accordance with a player's operation and a display device including a game screen showing a player object connected to a plurality of parts, said game apparatus comprising:
 a movement control unit which controls the movement of said player object based on said input information from said input device;
 a movement state determination logic unit which determines whether movement state of said player object has satisfied a requirement or not;
 a separation logic unit which separates said player object from said plurality of parts when said movement state determination logic unit determines that said requirement has been satisfied, and
 a display image generator which generates an image of the player object and the plurality of parts, wherein the plurality of parts are shown being separated from the player object.

8. A game apparatus according to claim 7, wherein said input device includes a mouse-type input device for detecting movement information of the game apparatus as said input information, and
 said movement control logic unit controls the movement of said player object based on said movement information detected by said mouse-type input device.

9. The non-transitory storage medium as in claim 1 wherein the movement control logic unit causes the connected parts to move with the player object.

10. The game apparatus as in claim 7 wherein the movement control logic unit causes the connected parts to move with the player object.

11. A non-transitory storage medium storing a game program for a game apparatus equipped with an input to receive input information from a player regarding movement of a player object shown in a game screen of a display device, wherein the game screen shows the player object is connected to a plurality of parts and wherein the game apparatus when executing the game program causes the game apparatus to:
 control movement of said player object based on said input information received from the player, wherein the plurality of parts move with the player object when connected to the player object;
 determine whether a movement state of said player object satisfies a movement state requirements;
 separate said player object from the parts such that the player object is displayed separately from the parts on the game screen, if the predetermine movement state requirement is satisfied, and
 a display image generator which generates for display on the screen an image of the player object and the plurality of parts, wherein the plurality of parts are shown being separated from the player object.

12. The non-transitory storage medium of claim 11 wherein the game program cause the game apparatus to:
 after separating said player object, control the movement of said player object based on said input information received from the player, and
 control the movement of one or more of the parts, after the one or more parts separate from the player object.

13. The non-transitory storage medium of claim 11 wherein the determination of whether the movement state of the player object satisfies the movement state requirement includes the game apparatus determining whether a movement speed of the player object with connected parts on the game screen is at least as great as a certain speed value.

14. The non-transitory storage medium of claim 11 wherein the determination of whether the movement state of the player object satisfies the movement state requirement includes the game apparatus determining whether a movement direction of the game player with connected parts changes direction more than a certain number of direction changes in a certain time period.

15. The non-transitory storage medium of claim 14 wherein the determination of whether the movement direction of the game player changes direction more than the certain number of direction changes in the certain time period includes detecting whether the game apparatus is being shaken.

16. A game system comprising:
 a display device;
 a player controlled input device which inputs input information;
 a generating unit which generates a virtual game space and display images of the virtual game space using the display device;
 a moving unit which moves a virtual player object through the virtual game space based on said input information;
 a first display unit which displays on the display device the virtual player object as it moves through the virtual game space and display virtual parts connected to and moving with the virtual player object;
 a determining unit which determines whether a movement state of said player object has satisfied a requirement or not, and
 a separation unit which separates said player object from at least one of the connected virtual parts in response to the determination that said requirement has been satisfied, and
 a second display unit which displays on the display device the player object and the separated at least one of the virtual parts after the at least one of the virtual parts has separated from the player object.

17. The game system of claim 16 wherein the determined movement condition includes a determination of a movement speed of the virtual player object, and the threshold value is a lower speed value.

18. The game system of claim 16 wherein the determined movement condition includes a movement direction of the virtual player object;
 the threshold value is a threshold angle, and
 the determination of the movement condition includes determining if the angle between a current movement direction of the virtual player object and a movement direction of the virtual player object immediately preceding movement direct exceeds the threshold angle.

19. The game system of claim 16 wherein the game system automatically controls the movement of the separated at least one of the connected virtual parts.

20. The game system of claim 16 wherein the game program when executed causes the game system to change an ability of said player object after the separation of the at least one of the connected virtual parts.

21. A method to perform a game presented by a display device and played using a player controlled input device, the method comprising:

generating a virtual game space and display images of the virtual game space using the display device;

moving a virtual player object through the virtual game space based on said input information, wherein the virtual player is connected to virtual parts;

displaying the virtual player object as it moves through the virtual game space and display the virtual parts connected to and moving with the virtual player object;

determining whether a movement condition of said virtual player object while connected to the virtual parts exceeds a threshold value; and separating said player object from at least one of the connected virtual parts in response to the determination that the movement exceeds the threshold value, and displaying the player object and the separated at least one of the virtual parts after the at least one of the virtual parts has separated from the player object.

22. The method of claim 21 wherein the determination of the movement condition includes determining whether a movement speed of the virtual player object exceeds a threshold value which is a speed value.

23. The method of claim 21 wherein the determined of the movement condition includes determining in real time movement directions of the virtual player object, and determining if an angle between a current movement direction of the virtual player object and a movement direction of the virtual player object immediately preceding movement direct exceeds the threshold value which is an angle value.

24. The method of claim 21 wherein the movement of the separated at least one of the connected virtual parts is determined automatically without player input information.

25. The method of claim 12 further comprising changing an ability of said player object after the separation of the at least one of the connected virtual parts.

26. A game apparatus comprising:

a display device;

a player controlled input device which inputs input information;

a generating unit which generates a virtual game space and display images of the virtual game space using the display device;

a moving unit which moves a virtual player object through the virtual game space based on said input information;

a first displaying unit which displays on the display device the virtual player object as it moves through the virtual game space and displays virtual parts connected to and moving with the virtual player object;

a determining unit which determines whether a movement state of said player object has satisfied a requirement or not, and a separating unit which separates said player object from at least one of the connected virtual parts in response to the determination that said requirement has been satisfied, and a second displaying unit which displays on the display device the player object and the separated at least one of the virtual parts after the at least one of the virtual parts has separated from the player object.

* * * * *